US012405241B2

United States Patent
Sun et al.

(10) Patent No.: US 12,405,241 B2
(45) Date of Patent: Sep. 2, 2025

(54) ELECTROCHEMICAL TEST STRIP FOR TESTING MULTIPLE INDICATORS, AND TESTING METHOD THEREOF

(71) Applicant: LEADWAY (HK) LIMITED, Sheung Wan Hong Kong (CN)

(72) Inventors: Yu Long Sun, Zhejiang (CN); Yan Cheng, Zhejiang (CN); Li Zhang, Zhejiang (CN); Yong Gang Huang, Zhejiang (CN); Jin Liang Shi, Zhejiang (CN)

(73) Assignee: LEADWAY (HK) LIMITED, Sheung Wan Hong Kong (CN)

( * ) Notice: Subject to any disclaimer, the term of this patent is extended or adjusted under 35 U.S.C. 154(b) by 119 days.

(21) Appl. No.: 18/003,383

(22) PCT Filed: Jan. 13, 2021

(86) PCT No.: PCT/CN2021/071526
§ 371 (c)(1),
(2) Date: Dec. 27, 2022

(87) PCT Pub. No.: WO2021/143730
PCT Pub. Date: Jul. 22, 2021

(65) Prior Publication Data
US 2024/0302312 A1    Sep. 12, 2024

(30) Foreign Application Priority Data
Jan. 14, 2020   (CN) .......................... 202020074643.1

(51) Int. Cl.
*G01N 27/30* (2006.01)
*G01N 27/327* (2006.01)
*G01N 27/416* (2006.01)

(52) U.S. Cl.
CPC ....... *G01N 27/307* (2013.01); *G01N 27/3275* (2013.01); *G01N 27/4161* (2013.01)

(58) Field of Classification Search
CPC ...... G01N 27/26; G01N 27/30; G01N 27/307; G01N 27/3275; G01N 27/4161; G01N 27/327; G01N 27/3272
See application file for complete search history.

(56) References Cited

U.S. PATENT DOCUMENTS 5,997,817 A    12/1999   Crismore et al.
6,299,757 B1   10/2001   Feldman et al.
(Continued)

FOREIGN PATENT DOCUMENTS

CN    203519550 U    4/2014
CN    204129003 U    1/2015
(Continued)

OTHER PUBLICATIONS

English Machine Translation CN109115854 (Year: 2018).*
(Continued)

*Primary Examiner* — Gurpreet Kaur
(74) *Attorney, Agent, or Firm* — Michael A. Whittaker

(57) ABSTRACT

The present invention provides an electrochemical test strip (200) for detecting multiple indicators and a test method thereof. The electrochemical test strip includes a first biosensor (100) provided with an insulating substrate (1), a first electrode system, a first channel forming layer (4) and a first upper cover layer (5), and a second biosensor (101) provided with an insulating substrate (8), a second electrode system, a second channel forming layer (11) and a second upper cover layer (12). The first biosensor (100) and the second biosensor (101) are located on the front and back sides of the electrochemical test strip (200), respectively. A sample addition port (6) of the electrochemical test strip (200) is in
(Continued)

liquid communication with a first channel forming area (55) of the first biosensor (100) and a second channel forming area (56) of the second biosensor (101), respectively.

19 Claims, 10 Drawing Sheets

(56) References Cited

U.S. PATENT DOCUMENTS

| | | | |
|---|---|---|---|
| 7,144,485 | B2 | 12/2006 | Hsu et al. |
| 8,021,528 | B2 | 9/2011 | Jang |
| 8,182,747 | B2 | 5/2012 | Marquant et al. |
| 8,323,467 | B2 | 12/2012 | MacFie et al. |
| 8,617,366 | B2 | 12/2013 | Winarta et al. |
| 8,632,664 | B2 | 1/2014 | MacFie et al. |
| 2005/0247573 | A1* | 11/2005 | Nakamura ......... G01N 27/3272 204/403.01 |
| 2007/0068808 | A1 | 3/2007 | Lee |
| 2008/0149480 | A1* | 6/2008 | Bell ................... C12Q 1/001 204/403.14 |
| 2015/0072404 | A1 | 3/2015 | Chen |
| 2015/0276671 | A1 | 10/2015 | Huang et al. |
| 2017/0176410 | A1 | 6/2017 | Hughes et al. |
| 2019/0233870 | A1 | 8/2019 | Buck et al. |

FOREIGN PATENT DOCUMENTS

| | | |
|---|---|---|
| CN | 204594927 U | 8/2015 |
| CN | 106353387 A | 1/2017 |
| CN | 106996951 A | 8/2017 |
| CN | 107085023 A | 8/2017 |
| CN | 206876623 U | 1/2018 |
| CN | 207020121 U | 2/2018 |
| CN | 109115854 A | 1/2019 |
| CN | 109358101 A | 2/2019 |
| CN | 109946352 A | 6/2019 |
| CN | 109946353 A | 6/2019 |
| CN | 209148584 U | 7/2019 |
| CN | 113125528 A | 7/2021 |
| CN | 113125529 A | 7/2021 |
| CN | 214539366 U | 10/2021 |
| CN | 214539367 U | 10/2021 |
| CN | 214749932 U | 11/2021 |
| CN | 215894465 U | 2/2022 |
| CN | 215894466 U | 2/2022 |
| KR | 0533229 B1 | 12/2005 |
| WO | 2021143730 A1 | 7/2021 |

OTHER PUBLICATIONS

International Preliminary Report on Patentability issued in PCT/CN2021/071526 dated Jul. 19, 2022—incl Engl lang tansl (13 pages total).

First Office Action issued by CNIPA in Chinese Patent Application No. 202110042814.1 dated Jan. 12, 2023—incl Engl lang tansl (9 pages total).

Response to First Office Action issued by CNIPA in Chinese Patent Application No. 202110042814.1 dated May 16, 2023—incl Engl lang tansl (8 pages total).

First Office Action issued by CNIPA in Chinese Patent Application No. 202110044560.7 dated Jan. 12, 2023—incl Engl lang tansl (9 pages total).

Response to First Office Action issued by CNIPA in Chinese Patent Application No. 202110044560.7 dated May 16, 2023—incl Engl lang tansl (8 pages total).

International Search Report issued in PCT/CN2021/071526 on Apr. 1, 2021.

\* cited by examiner

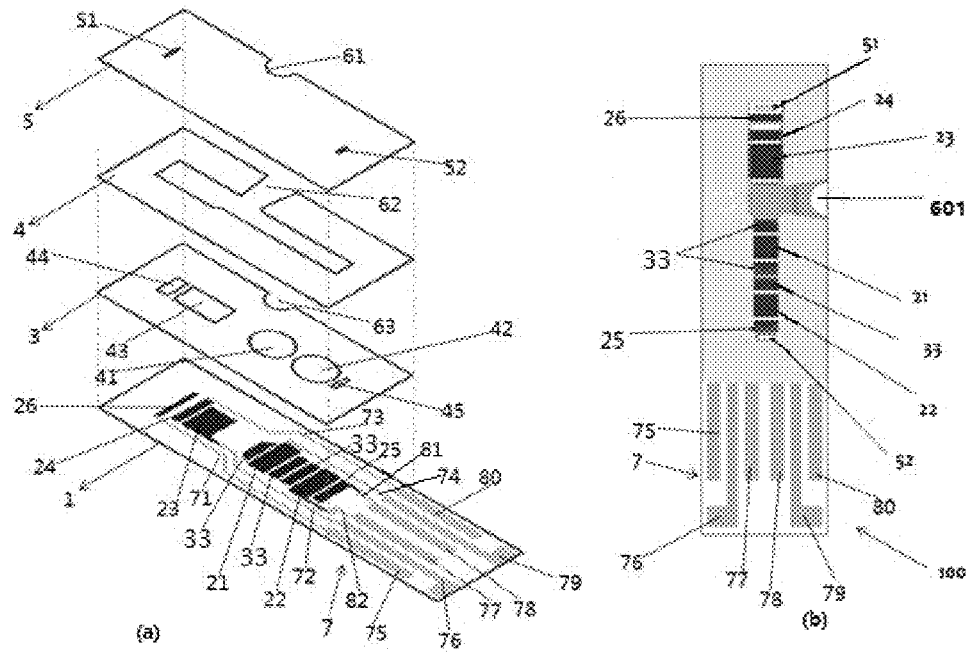
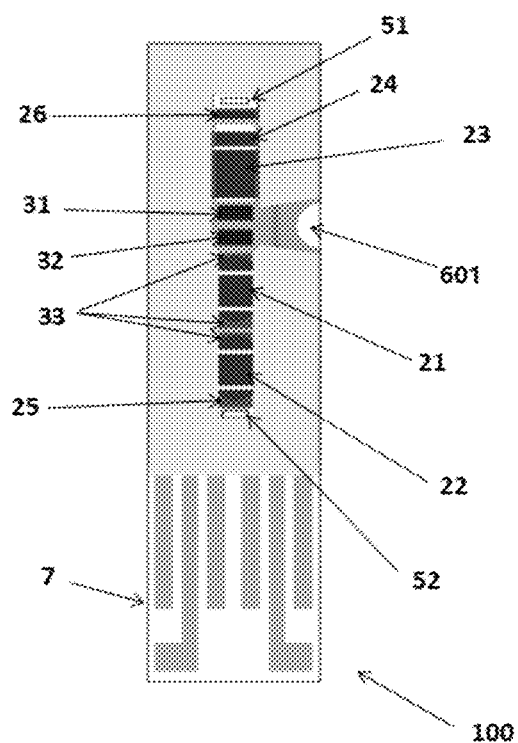
Fig.13
Fig.14

ELECTROCHEMICAL TEST STRIP FOR TESTING MULTIPLE INDICATORS, AND TESTING METHOD THEREOF

CROSS-REFERENCE TO RELATED APPLICATIONS

The present invention is filed under 35 U.S.C. § 371 as the U.S. national phase of International Application No. PCT/CN2021/071526, filed Jan. 13, 2021, which designated the United States and claims the benefit of priority of Chinese Patent Application No. 202020074643.1 filed Jan. 14, 2020, the contents of each of which are being hereby incorporated by reference in their entirety for all purposes.

FIELD OF THE INVENTION

The present invention relates to a electrochemical test strip for detecting multiple indicators in a sample such as blood and a test method thereof, belonging to the technical field of electroanalytical chemical detection.

BACKGROUND OF THE INVENTION

Electrochemical test strips with an electrode system have been widely used for rapid detection of biological samples, for example, for detection of various physiological indicators such as glucose, cholesterol and blood ketone in a blood sample. The basic structure of an electrochemical test strip includes an insulating substrate, an electrode system located on the insulating substrate, a channel forming layer, and an upper cover. The electrode system includes at least a working electrode and a counter electrode, and a reaction reagent covers at least one working electrode. A sample under detection passes through a channel forming area on the channel forming layer to react with the reaction reagent and generate a detectable signal. An analyzer connected to the electrochemical test strip arrives at a detection result according to this signal.

At present, most existing electrochemical test strips can only detect single sample indicator, and if multiple indicators are to be detected, different electrochemical test strips can only be used to detect different physiological indicators respectively. If it needs to complete detection of multiple physiologic indicators, patients must be subjected to blood sample collection multiple times. Multiple times of sampling not only bring pain to patients, but also take a long detection time and have cumbersome detection steps.

Chronic kidney disease and its resulting end-stage renal disease are a group of common chronic progressive diseases that pose a serious threat to human life and health, and have the characteristics of high prevalence, high mortality, high health care expenditure, low awareness rate, etc. In the diagnosis of renal function indicators of patients suffering from chronic renal disease, it is often necessary to obtain three physiological indicators—creatinine, urea and uric acid—in blood at the same time. Through detecting the three indicators, the degree of renal diseases of patients can be effectively detected and corresponding judgments can be made, which can be used as the basis for selecting further therapeutic regimens. At present, the detection of renal function indicators in the market mainly uses a single indicator test kit in conjunction with a large biochemical equipment. The test kit is expensive, long in test time and cumbersome in test steps, and thus is not suitable for popularization in townships and community health centers.

SUMMARY OF THE INVENTION

In view of deficiencies of the detection in the prior art, the present invention provides a novel electrochemical test strip which is available for detecting multiple sample indicators, thereby overcoming the limitations of the prior art: detection of only single sample indicator and the detection is dependent on use of a large biochemical equipment. The electrochemical test strip can be applied to detection in conjunction with a portable detecting instrument, and has the characteristics of small size, anti-interference property, low price and disposability, which provides convenience for inspection operations.

The present invention provides an electrochemical test strip for detecting multiple indicators, comprising a first biosensor which comprises an insulating substrate, a first electrode system disposed on the insulating substrate, a first channel forming layer and a first upper cover layer, a first channel forming area disposed in the first channel forming layer, the first channel forming area disposed above at least one electrode of the first electrode system, wherein the electrochemical test strip further comprises a second biosensor, and the second biosensor comprises an insulating substrate, a second electrode system disposed on the insulating substrate, a second channel forming layer and a second upper cover layer, a second channel forming area disposed in the second channel forming layer, the second channel forming area disposed above at least one electrode of the second electrode system; the first biosensor and the second biosensor are located on the front and back sides of the electrochemical test strip, respectively, and the electrical connection end of the first biosensor and the electrical connection end of the second biosensor are located at the same end of the electrochemical test strip; and the sample addition port of the electrochemical test strip is in liquid communication with the first channel forming area of the first biosensor and the second channel forming area of the second biosensor respectively.

Further, the first electrode system comprises an electrode system for measuring a first indicator and an electrode system for measuring a second indicator.

Further, the second electrode system comprises an electrode system for measuring a third indicator.

Further, the second electrode system comprises an electrode system for measuring a fourth indicator.

Further, the electrode system for measuring the first indicator and the electrode system for measuring the second indicator are located on two opposed sides of the sample addition port, respectively.

Further, the electrode system for measuring the third indicator and the electrode system for measuring the fourth indicator are located on two opposed sides of the sample addition port, respectively.

Further, the first biosensor and the second biosensor share one insulating substrate, or the first biosensor and the second biosensor each comprise an insulating substrate.

Further, a first reaction region forming layer is disposed between the insulating substrate and first channel forming layer of the first biosensor, and/or a second reaction region forming layer is disposed between the insulating substrate and second channel forming layer of the second biosensor.

Further, the sample addition port comprises a notch in the first upper cover layer and a notch in the second upper cover layer.

Further, the notches in the first upper cover layer and the second upper cover layer are located on the same side of the electrochemical test strip and aligned in position, and the notch in the first upper cover layer is larger than that in the second upper cover layer.

Further, the electrochemical test strip is also provided with a label for distinguishing the front and back sides of the electrochemical test strip.

Further, the label is a conductive automatic power-on contact and is disposed in at least one of the insulating substrate of the first biosensor and the insulating substrate of the second biosensor.

Further, the label is a colored insulating material; when the first upper cover layer and the first upper cover layer are transparent, the side of the insulating substrate of the first biosensor facing the first channel forming layer and the side of the insulating substrate of the second biosensor facing the second channel forming layer are made of materials of different colors; and when the first upper cover layer and the second upper cover layer are opaque, the first upper cover layer and the second upper cover layer are made of materials of different colors.

Further, the electrochemical test strip is used for measuring at least two indicators of glucose, cholesterol, hemoglobin, glycosylated hemoglobin, uric acid, urea, creatinine, bilirubin, ketone body, HCT and pH value. A method for detecting multiple indicators comprises providing the electrochemical test strip as described in the present invention.

The present invention further provides an electrochemical test strip for detecting renal function indicators, comprising a first biosensor which comprises an insulating substrate, a first electrode system disposed on the insulating substrate, a first channel forming layer and a first upper cover layer, a first channel forming area disposed in the first channel forming layer, the first channel forming area disposed above at least one electrode of the first electrode system, wherein the electrochemical test strip further comprises a second biosensor, and the second biosensor comprises an insulating substrate, a second electrode system disposed on the insulating substrate, a second channel forming layer and a second upper cover layer, a second channel forming area disposed in the second channel forming layer, the second channel forming area disposed above at least one electrode of the second electrode system; the electrochemical test strip further comprises a sample addition port in liquid communication with the first channel forming area of the first biosensor and the second channel forming area of the second biosensor, respectively; the first biosensor and the second biosensor are located on the front and back sides of the electrochemical test strip, respectively; and the first biosensor is used for determining two indicators of urea, creatinine and uric acid, and the second biosensor is used for determining a remaining third indicator of urea, creatinine and uric acid.

Further, the first electrode system comprises an electrode system for measuring urea and an electrode system for measuring creatinine.

Further, the second electrode system comprises an electrode system for measuring uric acid.

Furthermore, urea is measured using a potentiometric method.

Further, creatinine or uric acid is measured using an amperometric method.

Further, the electrode system for measuring urea and the electrode system for measuring creatinine are located on two opposed sides of the sample addition port, respectively.

Further, the second electrode system further comprises an electrode system for measuring HCT.

Further, the first channel forming area is divided into two parts, the first part of the first channel forming area is disposed above the electrode system for measuring creatinine, the second part of the first channel forming area is disposed above the electrode system for measuring urea, and the width of the first part of the first channel forming area is greater than the width of the second part of the first channel forming area.

Further, a first reaction region forming layer is disposed between the insulating substrate and first channel forming layer of the first biosensor, and/or a second reaction region forming layer is disposed between the insulating substrate and second channel forming layer of the second biosensor.

A method for detecting renal function indicators comprises providing the electrochemical test strip as described in the present invention.

The present invention further provides an electrochemical test strip, comprising a first biosensor which comprises an insulating substrate, a first electrode system disposed on the insulating substrate, and a first channel forming layer, a first channel forming area disposed in the first channel forming layer, the first channel forming area disposed above at least one electrode of the first electrode system, the sample addition port being in liquid communication with the first channel forming area, wherein the first electrode system comprises an electrode system for measuring a first indicator and an electrode system for measuring a second indicator, and the electrode system for measuring the first indicator and the electrode system for measuring the second indicator are located on two opposed sides of the sample addition port, respectively.

Further, the first biosensor is provided with a hydrophilic element located at or near a diverging point of the first biosensor.

Further, the hydrophilic element is located below the first channel forming area.

Further, the first electrode system comprises an electrode system for measuring a first indicator and an electrode system for measuring a second indicator, and the hydrophilic element is located between the electrode system for measuring the first indicator and the electrode system for measuring the second indicator.

Further, a hydrophobic insulating region is disposed between the hydrophilic element and the first electrode system of the first biosensor.

Further, the electrochemical test strip also comprises a second biosensor, which comprises an insulating substrate, a second electrode system disposed on the insulating substrate, a second channel forming layer and a second upper cover layer, wherein a second channel forming area is disposed in the second channel forming layer, the second channel forming area disposed above at least one electrode of the second electrode system; and the first biosensor and the second biosensor are disposed on the front and back sides of the electrochemical test strip, respectively.

Further, the first biosensor and the second biosensor share one insulating substrate, or the first biosensor and the second biosensor each comprise an insulating substrate.

Further, the second biosensor is provided with a hydrophilic element located at or near a diverging point of the second biosensor.

Further, the second electrode system comprises an electrode system for measuring a third indicator and an electrode system for measuring a fourth indicator, and the hydrophilic element is located between the electrode system for measuring the third indicator and the electrode system for measuring the fourth indicator.

Further, a hydrophobic insulating region is disposed between the hydrophilic element and the second electrode system of the second biosensor.

The present invention further provides an electrochemical test strip for detecting multiple indicators in a sample, which comprises a sample addition port and a first biosensor, the first biosensor comprising an insulating substrate, a first electrode system disposed on the insulating substrate, a first channel forming layer and a first upper cover layer, a first channel forming area disposed in the first channel forming layer, the first channel forming area disposed above at least one electrode of the first electrode system, wherein the electrochemical test strip further comprises a second biosensor, and the second biosensor comprises an insulating substrate, a second channel forming layer and a second upper cover layer, a second channel forming area disposed in the second channel forming layer, the second channel forming area disposed above at least one electrode of the second electrode system; and the first biosensor and the second biosensor are located on the front and back sides of the electrochemical test strip, respectively.

Further, the sample addition port comprises a notch disposed in the insulating substrate of the first biosensor and a notch disposed in the insulating substrate of the second biosensor, a notch disposed in the first channel forming layer and being in liquid communication with the first channel forming area, a notch disposed in the second channel forming layer and being in liquid communication with the second channel forming area, and a notch disposed in the first upper cover layer and a notch disposed in the second upper cover layer; and the notches in the insulating substrate, the first channel forming layer and the first upper cover layer of the first biosensor and the notches in the insulating substrate, the second channel forming layer and the second upper cover layer of the second biosensor are located on the same side of the electrochemical test strip and aligned in position.

Further, the notch in the first upper cover layer is larger than the notch in the second upper cover layer.

Further, the sample addition port comprises a first sample addition port located in the first biosensor and a second sample addition port located in the second biosensor, and the first sample addition port and the second sample addition port are located on the same side or two opposite sides of the electrochemical test strip.

Further, a first reaction region forming layer is disposed between the insulating substrate and the first channel forming layer of the first biosensor, and a second reaction region forming layer is disposed between the insulating substrate and the second channel forming layer of the second biosensor.

Further, the first reaction region forming layer is provided with a notch in a position corresponding to the notch in the first channel forming layer, and the second reaction region forming layer is provided with a notch in a position corresponding to the notch in the second channel forming layer.

Beneficial effects of the present invention: (1) the electrochemical test strip adopted in the present invention is assembled by two biosensors to achieve electrode arrangement on the its front and back sides, so that a single electrochemical test strip can be utilized to detect multiple indicators. (2) The sample addition port employs a notch design, and the dimension of the notch located in the first upper cover layer in the first biosensor is larger than that of the notch in the second upper cover layer in the second biosensor, which is beneficial to loading the sample on the second insulating substrate of the second biosensor, facilitating the rapid flow of the sample into the electrochemical test strip. (3) Diffusion components assisting diffusion of reaction reagents can be disposed at two ends of each electrode used for detecting creatinine, urea and uric acid, which is conductive to the diffusion of the reaction reagents in corresponding reaction regions. (4) Whether in the first biosensor or in the second biosensor, there is a sample filling electrode made of carbon ink, which not only can be used for detecting whether the sample flowing to the first electrode system or the second electrode system is adequate but also can function as a diffusion component. (5) In the detection of four indicators consisting of urea, creatinine, uric acid and HCT, the HCT value measured once can simultaneously achieve HCT correction on the measured values of three analytes, i.e., creatinine, uric acid and urea, and eventually complete the detection on multiple indicators including creatinine, uric acid, urea, HCT and the like in a short time, and the detection results are accurate.

BRIEF DESCRIPTION OF THE DRAWINGS

FIG. 13(a) is an exploded view of a first biosensor of a fourth electrochemical test strip, and FIG. 13(b) is a schematic diagram of the first biosensor in (a) when being assembled together.

FIG. 14 is a schematic diagram of the first biosensor containing a hydrophilic element when being assembled together.

DETAILED DESCRIPTION OF THE EMBODIMENTS

Figure 1:
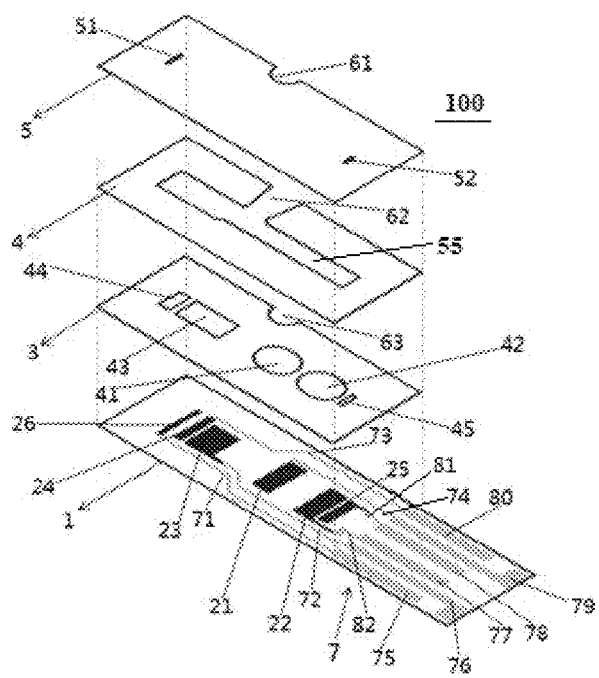
FIG. 1 shows an exploded view of a first biosensor of a first electrochemical test strip, with the first insulating substrate without a notch.
Figure 2:
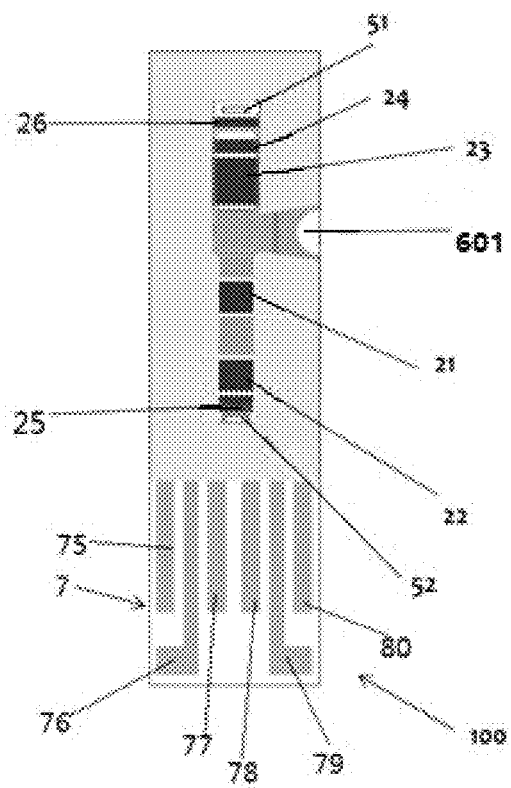
FIG. 2 is a schematic diagram of the first biosensor in FIG. 1 when being assembled together.

In a first embodiment of the invention, as shown in FIGS. 1 to 7, an electrochemical test strip 200 includes a first biosensor 100 and a second biosensor 101, and the first biosensor 100 and the second biosensor 101 do not share the same insulating substrate. The first biosensor 100 has a first electrical connection end 7 and the second biosensor 101 has a second electrical connection end 13. The electrochemical test strip 200 can be connected with an electrical connector of a detecting instrument by locating the first electrical connection end 7 and the second electrical connection end 13 at the same end of the electrochemical test strip 200. The sample addition port of the electrochemical test strip 200 includes a first sample addition port 601 located on the lateral side of the first biosensor 100 and a second sample addition port 602 located on the lateral side of the second biosensor 101.

The first biosensor 100 is sequentially provided with a first insulating substrate 1, a first electrode system disposed on the first insulating substrate 1, a first reaction region forming layer 3, a first channel forming layer 4 and a first upper cover layer 5. The first insulating substrate 1, the first reaction region forming layer 3, the first channel forming layer 4 and the first upper cover layer 5 are all made of an insulating material. The first electrode system includes a first indicator reference electrode 21; a first indicator working electrode 22; a second indicator working electrode 23; a second indicator counter electrode 24; first conductive contact 79, second conductive contact 77, third conductive contact 76 and fourth conductive contact 80 located at the first electrical connection end 7, and a first conductive trace 74 connecting the first indicator reference electrode 21 with the first contact 79, a second conductive trace 82 connecting the first indicator working electrode 22 with the second contact 77, a third conductive trace 72 connecting the second indicator working electrode 23 with the third contact 76, and a fourth conductive trace 73 connecting the second indicator counter electrode 24 with the fourth contact 80. The first indicator reference electrode 21 and first indicator working electrode 22 are located on one side of the first sample addition port 601, and the second indicator working electrode 23 and second indicator counter electrode 24 are located on the other opposite side of the first sample addition port 601.

The first reaction region forming layer 3 covers the first electrode system. The first reaction region forming layer 3 has three spaced reaction regions: a first reaction region 42, a second reaction region 41 and a third reaction region 43. The shapes of the reaction regions can be selected from rectangle, oval, circle, chamfered rectangle and other geometric shapes. The second reaction region 41 contains a first indicator first reaction reagent, the first reaction region 42 contains a first indicator second reaction reagent, and the third reaction region 43 contains a second indicator reaction reagent. The third reaction region 43 at least partially exposes the second indicator working electrode 23 and the second indicator counter electrode 24, the second reaction region 41 at least partially exposes the first indicator reference electrode 21, and the first reaction region 42 at least partially exposes the first indicator working electrode 22.

The first channel forming layer 4 is disposed over the first reaction region forming layer 3, the first channel forming layer 4 has a first channel forming area 55, a notch 62 is disposed on one side of the first channel forming layer 4, and the notch 62 is in fluid communication with the first channel forming area 55. Preferably, the first channel forming area 55 is located in the middle region of the first channel forming layer 4, and the notch 62 is located in the middle part of one side of the first channel forming layer 4. The notch 62 divides the first channel forming area 55 into two parts. After a sample is added from the first sample addition port 601, the sample enters into the first biosensor 100, and when the sample enters into the first channel forming layer 4 through the notch 62, sample diverging occurs at this moment, with one part of the sample flowing into the first part of the first channel forming area 55 and the other part of the sample flowing into the second part of the first channel forming area 55. The sample flowing into the first part of the first channel forming area 55 eventually flows to the second indicator working electrode 23 and the second indicator counter electrode 24 through the third reaction region 43, and the sample flowing into the second part of the first channel forming area 55 eventually flows to the first indicator reference electrode 21 and the first indicator working electrode 22 through the second reaction region 41 and the first reaction region 42.

The first part of the first channel forming area 55 at least partially exposes the third reaction region 43. The second part of the first channel forming area 55 at least partially exposes the second reaction region 41 and the first reaction region 42, and the width of the first part of the first channel forming area 55 may be less than, equal to, or greater than the width of the second part of the first channel forming area 55. For example, when the first indicator under detection is urea and the second indicator under detection is creatinine, the width of the first part of the first channel forming area 55 is greater than the width of the second part of the first channel forming area 55, which can completely expose the third reaction region 43 and the advantage is that when the concentration of an indicator such as creatinine in the sample is detected by the amperometric method, the detected current signal is related to the area of the third reaction region 43, and when the third reaction region 43 is completely exposed by the first part of the first channel forming area 55, all of the third reaction region 43 is effective area and can generate effective signals, so that the usage amounts of reaction reagents can be reduced; and when the concentration of an indicator such as urea in the sample is detected by the potentiometric method, the detected potential signal is not much correlated with the area of the second reaction region 41 and the first reaction region 42, so that reducing the width of the second part of the first channel forming area 55 can reduce the usage amount of the sample.

The first upper cover layer 5 is disposed over the first channel forming layer 4. The first upper cover layer 5 forms a first sample channel together with the first channel forming area 55, the second reaction region 41, the first reaction region 42 and the third reaction region 43.

The first upper cover layer 5 is provided with a first air hole 51 and a second air hole 52 for discharging the air in the first sample channel during sample addition. The first air hole 51 is located above the first part of the first channel forming area 55 and is in communication with the first part of the first channel forming area 55 on the air path. The second air hole 52 is located above the second part of the first channel forming area 55 and in communication with the second part of the first channel forming area 55 on the air path.

The second biosensor 101 is sequentially provided with a second insulating substrate 8, a second electrode system disposed on the second insulating subsystem substrate 8, a second reaction region forming layer 10, a second channel forming layer 11 and a second upper cover layer 12. The second insulating substrate 8, the second reaction region forming layer 10, the second channel forming layer 11 and the second upper cover layer 12 are all made of an insulating material.

The second electrode system includes a third indicator counter electrode 29, a third indicator working electrode 30, fifth conductive contact 86 and sixth conductive contact 84 located at the second electrical connection end 13, a fifth conductive trace 91 connecting the third indicator counter electrode 29 with the fifth contact 86, and a sixth conductive trace 89 connecting the third indicator working electrode 30 with the sixth contact 84. More conductive traces or contacts can be disposed on the second insulating substrate 8 as needed.

The second reaction region forming layer 10 covers the second electrode system. The second reaction region forming layer 10 has a fourth reaction region 46. The shape of the fourth reaction region 46 can be selected from rectangle, oval, circle, chamfered rectangle and other geometric shapes. The fourth reaction region 46 contains a third indicator reaction reagent. Preferably, the fourth reaction region 46 partially exposes the third indicator counter electrode 29 and the third indicator working electrode 30.

The second channel forming layer 11 is disposed over the second reaction region forming layer 10, the second channel forming layer 11 has a second channel forming area 56, a notch 66 is disposed on one side of the second channel forming layer 11, and the notch 66 is in fluid communication with one end or the middle part of the second channel forming area 56. After a sample is added through the second sample addition port 602, the sample enters into the second biosensor 101 and then enters into the second channel forming area 56 through the notch 66 and eventually flows to the third indicator counter electrode 29 and the third indicator working electrode 30.

The second upper cover layer 12 is disposed over the second channel forming layer 11. The second upper cover layer 12 forms a second sample channel together with the second channel forming area 56 and the fourth reaction region 46. The second upper cover layer 12 contains a third air hole 53. The second sample channel is used to provide a sample to the third indicator counter electrode 29 and the third indicator working electrode 30, dissolve the reaction reagent in the fourth reaction region 46 and react to generate an electrical signal. The third air hole 53 is located above the second sample channel, and is in communication with the second sample channel on the air path to discharge the air in the second sample channel when the sample is added.

In the first biosensor 100, one side of the first upper cover layer 5 is provided with a notch 61, one side of the first channel forming layer 4 is provided with a notch 62, and one side of the first reaction region forming layer 3 is provided with a notch 63. The first insulating substrate 1 is without a notch. The notch 61, the notch 62 and the notch 63 are disposed on the same side of the first biosensor 100 and are aligned in position. The word "align(ed)" as mentioned herein refers to that when two notches are aligned, one of the two notches completely overlaps with the projected region of the other notch if the dimensions (i.e., size and/or shape) of the two notches are the same, and one of the notches is located inside the projected region of the other notch if the dimensions of the two notches are not the same. When the first insulating substrate 1, the first reaction region forming layer 3, the first channel forming layer 4 and the first upper cover layer 5 of the first biosensor 100 are assembled together, the notch 61, the notch 62 and the notch 63 together form the first sample addition port 601. In the second biosensor 101, one side of the second upper cover layer 12 is provided with a notch 65, one side of the second channel forming layer 11 is provided with a notch 66, and one side of the second reaction region forming layer 10 is provided with a notch 67. The second insulating substrate 8 is without a notch. The notch 65, the notch 66 and the notch 67 are disposed on the same side of the second biosensor 101 and are aligned in position. When the second insulating substrate 8, the second reaction region forming layer 10, the second channel forming layer 11 and the second upper cover layer 12 of the second biosensor 101 are assembled together, the notch 65, the notch 66 and the notch 67 together form the second sample addition port 602. As neither the first insulating substrate 1 nor the second insulating substrate 8 is provided with a notch, the first sample addition port 601 and the second sample addition port 602 do not form into a whole. When the first biosensor 100 and the second biosensor 101 are assembled together, the first sample addition port 601 and the second sample addition port 602 are located on the same side of the electrochemical test strip 200 and are aligned in position. The first sample addition port 601 and the second sample addition port 602 may also be located on the same side of the electrochemical test strip 200, but not aligned in position, and furthermore, the first sample addition port 601 and the second sample addition port 602 may also be located on different sides of the electrochemical test strip 200.

When the first biosensor 100 and the second biosensor 101 are assembled together, after the sample is added through the first sample addition port 601, the sample flows into the first biosensor 100 and enters into the first channel forming area 55 through the notch 61 and the notch 62, and the notch 62 divides the first channel forming area 55 into two parts, therefore, the sample entering the first channel forming area 55 undergoes diverging at this time, with one part of the sample flowing into the first part of the first channel forming area 55, and the other part of the sample flowing into the second part of the first channel forming area 55. The sample flowing into the first part of the first channel forming area 55 eventually flows to the second indicator working electrode 23 and the second indicator counter electrode 24 through the third reaction region 43, and the sample flowing into the second part of the first channel forming area 55 eventually flows to the first indicator reference electrode 21 and the first indicator working electrode 22 through the second reaction region 41 and the first reaction region 42. After the sample is added through the second sample addition port 602, the sample enters into the second biosensor 101 and then enters into the second channel forming area 56 through the notch 65 and the notch 66, and the sample flowing into the second channel forming area 56 passes through the fourth reaction region 46 and eventually flows to the third indicator counter electrode 29 and the third indicator working electrode 30.

In the electrochemical test strip of the present invention, the first indicator reference electrode 21 and the first indicator working electrode 22 are used to detect the first indicator in the sample, the second indicator working electrode 23 and the second indicator counter electrode 24 are used to detect the second indicator in the sample, and the third indicator counter electrode 29 and the third indicator working electrode 30 are used to detect the third indicator in the sample. The first, second and third indicators can be the levels of analytes such as glucose, cholesterol, hemoglobin, glycosylated hemoglobin, uric acid, urea, creatinine, bilirubin and ketone body in the sample, or the physicochemical properties of the sample, such as pH value and HCT, or whether the added amount of the sample is adequate. During the detection, electrochemical parameters such as current, potential, electric quantity, conductance and resistance generated after addition of the sample can be detected as needed, and then the levels or presence or absence of the different indicators to be measured can be determined based on the detected electrochemical parameters.

The second reaction region 41 contains the first indicator first reaction reagent, the first reaction region 42 contains the first indicator second reaction reagent, the third reaction region 43 contains the second indicator reaction reagent, and the fourth reaction region 46 contains the third indicator reaction reagent. The four reaction reagents can be respectively added to the corresponding reaction regions by a method such as solution dropping or screen printing. The present invention combines solution dropping and screen printing methods to add the four reaction reagents to the corresponding four reaction regions, respectively.

For the sake of facilitating illustration, here the first indicator reference electrode 21 and the first indicator working electrode 22 detect urea in the sample by the potentiometric method, the second indicator working electrode 23 and the second indicator counter electrode 24 detect creatinine in the sample by the amperometric method, and the third indicator counter electrode 29 and the third indicator working electrode 30 detect uric acid in the sample by the amperometric method. In order to detect urea, the first indicator first reaction reagent contains a buffer, such as PBS; a polymer binder, such as methylcellulose; a surfactant, such as Triton X-100; and urease. The first indicator second reaction reagent contains a buffer, such as PBS; a polymer binder, such as methylcellulose; a surfactant, such as Triton X-100; and electron carrier, such as a ruthenium compound (for example, hexaammineruthenium chloride), potassium ferricyanide or potassium ferricyanide. In order to detect creatinine, the second indicator reaction reagent contains a buffer, such as PBS; a polymer binder, such as methylcellulose; a stabilizer, such as sucrose; a surfactant, such as Triton X-100; creatininase, creatinekinase, and sarcosine oxidase; and an electron carrier, such as a ruthenium compound, potassium ferricyanide or potassium ferricyanide. In order to detect urea, the third indicator reaction reagent contains a buffer, such as PBS; a polymer binder, such as methylcellulose; a stabilizer, such as trehalose; a surfactant, such as Triton X-100; and an electron carrier, such as ruthenium compound, potassium ferricyanide or potassium ferricyanide. The first indicator first reaction reagent and the first indicator second reaction reagent for detecting urea, and the second indicator reaction reagent for detecting creatinine can be added to the second reaction region 41, the first reaction region 42 and the third reaction region 43 respectively in a manner of solution dropping or the like; and the third indicator reaction reagent for detecting uric acid is added to the fourth reaction region 46 through screen printing.

There are many methods for preparing the electrochemical test strip of the present invention, one of which is selected for introduction here. This method can be divided into five processes: a screen printing process, a first base card solution fixing process, a second base card solution fixing process, a laminating process and a cutting process.

In the screen printing process, each electrode in the first electrode system is formed on the first insulating substrate 1 by screen printing of silver ink, each conductive trace and each contact in the first electrode system are formed on the first insulating substrate 1 by screen printing of conductive carbon ink, there is no special sequence requirements on whether the electrodes or the conductive traces and contacts are printed at first, and their printing can be carried out at the same time. Each electrode in the second electrode system is formed on the second insulating substrate 8 by screen printing of silver ink, each conductive trace and each contact in the second electrode system are formed on the second insulating substrate 8 by screen printing of conductive carbon ink, there is no special sequence requirements on whether the electrodes or the conductive traces and contacts are printed at first, and their printing can be carried out at the same time. In addition, there is no special sequence requirement on whether the first electrode system or the second electrode system is printed at first, and their printing can be carried out at the same time.

Then, the first reaction region forming layer 3 covering the first electrode system and a second reaction region forming layer 10 covering the second electrode system are formed respectively through screen printing of insulating carbon ink, wherein whether in the first electrode system or the second electrode system, each electrode is formed by screen printing of silver ink, and each conductive trace and contact are formed by screen printing of conductive carbon ink.

In the first base card solution fixing process, on the first insulating substrate 1 and the first reaction region forming layer 3 with screen printing completed, the first indicator first reaction reagent solution and the first indicator second reaction reagent solution for detecting the first indicator and the second indicator reaction reagent solution for detecting the second indicator are fixed to the second reaction region 41, the first reaction region 42 and the third reaction region 43 of the first reaction region forming layer 3, respectively. The first channel forming layer 4 is affixed to the first reaction region forming layer 3, wherein the width of the third reaction region formed is 1.0 to 3.0 mm, and the width of the second reaction region 41 and the width of the first reaction region 42 are 0.5 to 2.0 mm; then the first upper cover layer 5 covers the first channel forming layer 4, and then is rolled to enable tight affixing of the first channel forming layer 4 and the first upper cover layer 5, thus completing the production of an electrochemical test base card. Wherein, when the first reaction region forming layer 3 is screen printed, a hydrophobic insulating material (such as insulating ink) can be printed on the first insulating substrate 1 by the screen printing method, and then the first reaction region 42, the second reaction region 41 and the third reaction region 43 which are spaced each other are cut on the first reaction region forming layer 3 by laser cutting or other methods. It is also possible that in screen printing, some regions of the first insulating substrate 1 and the second insulating substrate 8 are not printed with an insulating material, so that the second reaction region 41, the first reaction region 42 and the third reaction region 43 which are spaced each other are generated on the first reaction region forming layer 3, and a fourth reaction region 46 is generated on the second reaction region forming layer 10.

In the second base card solution fixing process, the solution fixing process is performed on the second electrode system and the second reaction region forming layer 10 with screen printing completed, the second indicator reaction reagent solution for detecting the third indicator is fixed to the fourth reaction region 46 of the second reaction region forming layer 10. The second channel forming layer 11 is affixed to the second reaction region forming layer 10, wherein the width of the fourth reaction region 46 formed is 1.0 to 3.0 mm; then the second upper cover layer 12 covers the second channel forming layer 11, and then is rolled to enable tight affixing of the second channel forming layer 11 and the second upper cover layer 12, thus completing the production of a second base card. When the second reaction region forming layer 10 is screen printed, a hydrophobic insulating material (such as insulating ink) can be printed on the second insulating substrate 8 by the screen printing method, and then the fourth reaction region 46 is cut on the second reaction region forming layer 10 by laser cutting or other methods. It is also possible that during screen printing, one region of the second insulating substrate 8 is not printed with an insulating material, so that the fourth reaction region 46 is generated on the second reaction region forming layer 10.

In the laminating process, the first insulating substrate 1 of the first base card and the second insulating substrate 8 of the second base card are adhered together by an adhesive such as double-sided adhesive tape, and then rolled to enable tight affixing of the first base card and the second base card to form an electrochemical test base card. In the cutting process, the electrochemical test base card is cut into multiple electrochemical test strips.

In addition, the first reaction region forming layer 3 and the second reaction region forming layer 10 may be selected as a double-sided adhesive tape or single-sided adhesive tape, so that the first reaction region forming layer 3 and the second reaction region forming layer 10 are adhered to the first insulating substrate 1 and the second insulating substrate 8, respectively. In addition, the first reaction region forming layer 3 or the second reaction region forming layer 10 may be supported by a plastic sheet and then coated with a pressure-sensitive adhesive or a photosensitive polymer on one side thereof, wherein the photosensitive polymer is bound to the insulating substrate under the action of ultrasonic wave.

In the second embodiment of the present invention, an electrochemical test strip is utilized to detect multiple indicators in a sample. It differs from the first embodiment in that as shown in FIGS. 1, 2, 5 and 6, the first electrode system further includes a pair of electrodes for detecting whether the added sample is adequate or not: a first sample filling electrode 25 and a second sample filling electrode 26, and the first reaction region forming layer 3 also has a first exposure hole 44 and a second exposure hole 45. The first indicator reference electrode 21, the first indicator working electrode 22, the second indicator working electrode 23 and the second indicator counter electrode 24 are located between the first sample filling electrode 25 and the second sample filling electrode 26, and the first sample filling electrode 25 and the second sample filling electrode 26 are connected with a seventh contact 78 and an eighth contact 75 disposed at the first electrical connection end 7 respectively by a seventh conductive trace 81 and an eighth conductive trace 71. The first sample filling electrode 25 is closest to the first electrical connection end 7, and the second sample filling electrode 26 is farthest from the first electrical connection end 7. The positions of the first sample filling electrode 25 and the second sample filling electrode 26 can also be adjusted, so that the second sample filling electrode 26 is closest to the first electrical connection end 7, and the first sample filling electrode 25 is farthest from the first electrical connection end 7. The first sample filling electrode 25 and the second sample filling electrode 26 are made of conductive materials and may be formed on the first insulating substrate by screen printing. When the sample is added through the first sample addition port 601, the sample is divided into two parts at the first biosensor 100 and flows in two opposite directions: one part of the sample flows toward the first electrical connection end 7 to the first indicator reference electrode 21 and the first indicator working electrode 22; and the other part of the sample flows in the opposite direction to the second indicator working electrode 23 and the second indicator counter electrode 24. After addition of the sample, whether the sample flowing to the first indicator reference electrode 21 and the first indicator working electrode 22 and the sample flowing to the second indicator working electrode 23 and the second indicator counter electrode 24 are adequate can be determined by detecting an electrical signal such as current, voltage or impedance between the first sample filling electrode 25 and the second sample filling electrode 26.

The first exposure hole 44 at least partially exposes the first sample filling electrode 25 and the second exposure hole 45 at least partially exposes the second sample filling electrode 26. The first exposure hole 44 is in communication with a first air hole 51 disposed in the first biosensor 100 on the air path, thereby facilitating flowing of the sample to the second indicator working electrode 23 and the second indicator counter electrode 24. The second exposure hole 45 is in communication with a second air hole 52 disposed in the first biosensor 100 on the air path, thereby facilitating flowing of the sample to the first indicator reference electrode 21 and the first indicator working electrode 22. The first part of the first channel forming area 55 at least partially exposes the third reaction region 43 and the first exposure hole 44. The second part of the first channel forming area 55 at least partially exposes the second reaction region 41, the first reaction region 42, and the second exposure hole 45. Of course, the third reaction region 43 and the first exposure hole 44 may be merged into a whole. Moreover, the second reaction region 41 and the first reaction region 42 may be merged into a whole, or only one of the two is left.

Figure 3:
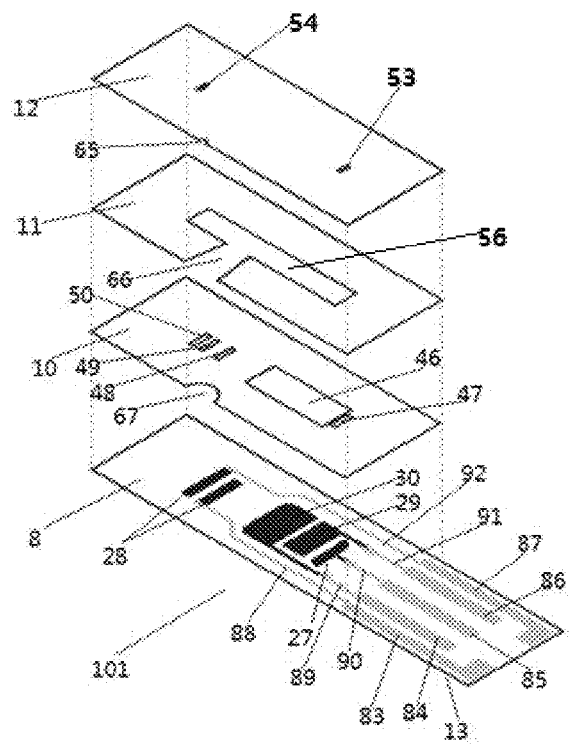
FIG. 3 is an exploded diagram of a second biosensor of the first electrochemical test strip, with the second insulating substrate without a notch.
Figure 4:
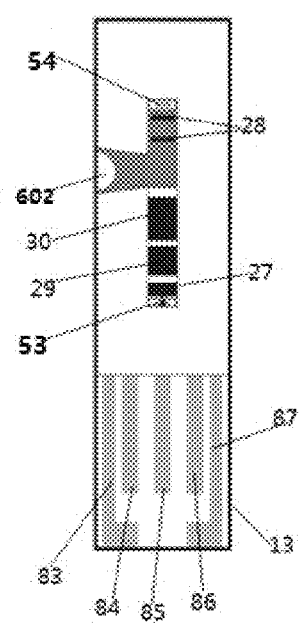
FIG. 4 is a schematic diagram of the second biosensor in FIG. 3 when being assembled together.

In the third embodiment of the present invention, an electrochemical test strip is utilized to detect multiple indicators in a sample. It differs from the first embodiment in that as shown in FIGS. 3 and 4, the second electrode system is further provided with a third sample filling electrode 27 for detecting whether the added sample is adequate or not; and the second reaction region forming layer 10 has a third exposure hole 47. The third sample filling electrode 27 is connected with a ninth contact 85 through a ninth conductive trace 90. The distance from the third sample filling electrode 27 to the second electrical connection end 13 is less than the distance from any one of the third indicator counter electrode 29 and the third indicator working electrode 30 to the second electrical connection end 13. The third exposure hole 47 at least partially exposes the third sample filling electrode 27. The third exposure hole 47 is in communication with the third air hole 53 disposed in the second biosensor 101 on the air path.

Figure 5:
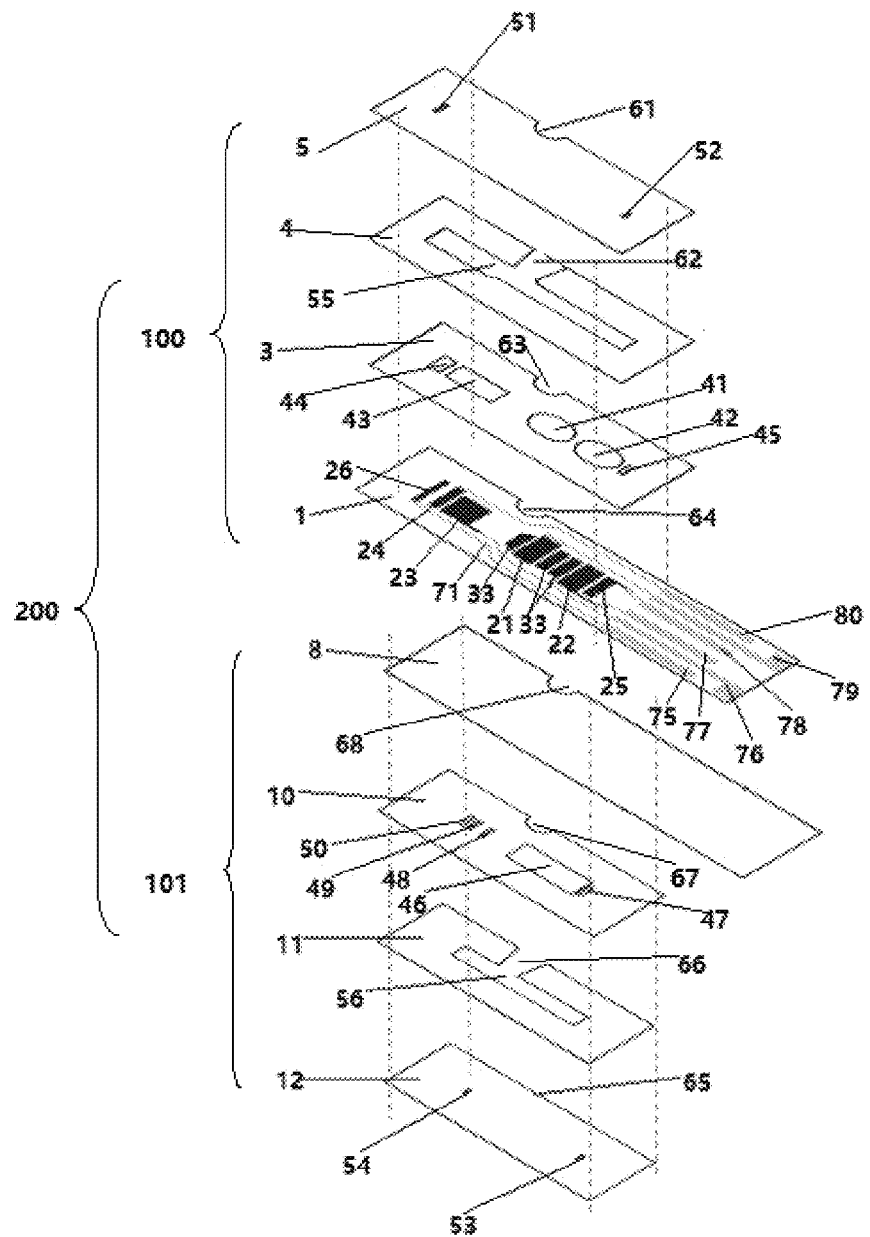
FIG. 5 is an exploded view of a second electrochemical test strip.
Figure 6:
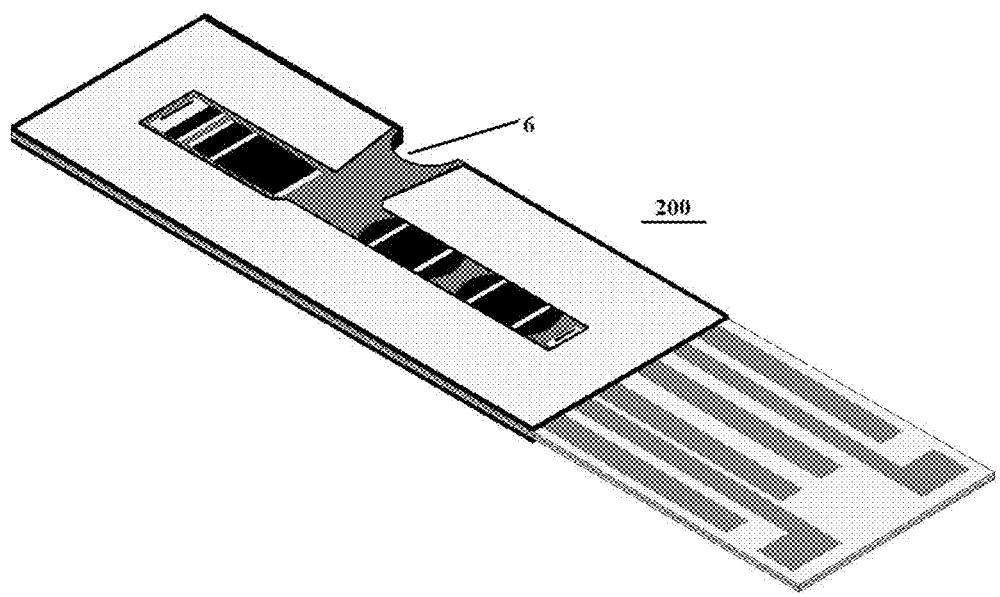
FIG. 6 is a schematic diagram of the electrochemical test strip in FIG. 5 when being assembled together.
Figure 7:
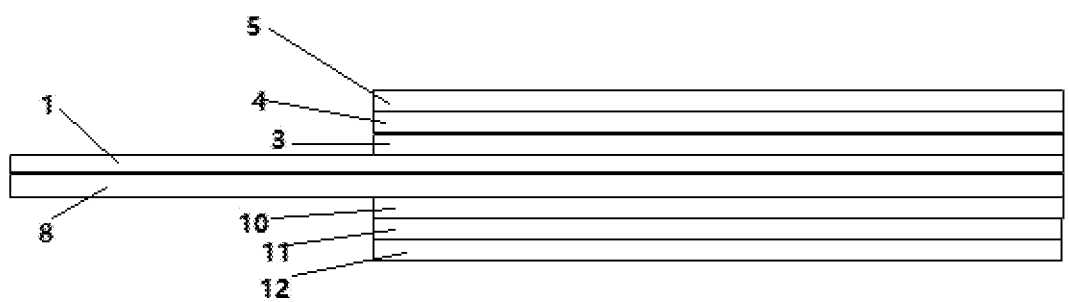
FIG. 7 is a lateral schematic diagram of the electrochemical test strip, with the first biosensor and the second biosensor not sharing the same insulating substrate.

When a sample is added through the second sample addition port 602, the sample flows into the second biosensor 101, and whether the sample flowing to the third indicator counter electrode 29 and the third indicator working electrode 30 is adequate can be determined by detecting the signal between the third sample filling electrode 27 and the third indicator counter electrode 29 or the third indicator working electrode 30. In the fourth embodiment of the present invention, as shown in FIGS. 3 to 5, an electrochemical test strip is utilized to detect multiple indicators in a sample. It differs from the first embodiment in that the second electrode system of the second biosensor is further provided with a pair of special HCT electrodes 28 for detecting the indicator HCT in the sample to correct the test differences caused by different HCT level in the blood sample; the notch 66 disposed on one side of the second channel forming layer 11 is in liquid communication with the middle part of the second channel forming area 56; the second reaction region forming layer 10 has a fourth exposure hole 48, a fifth exposure hole 49 and a sixth exposure hole 50; and the second upper cover layer 12 contains a third air hole 53 and a fourth air hole 54. In the pair of HCT electrodes 28, one of the HCT electrodes is connected with a tenth contact 83 through a tenth conductive trace 88, and the other HCT electrode is connected to an eleventh contact 87 through an eleventh conductive trace 92. The pair of special HCT electrodes 28 is located on one side of the second sample addition port 602, and the third indicator counter electrode 29 and the third indicator working electrode 30 are located on the other opposite side of the second sample addition port 602. Of course, the pair of special HCT electrodes 28 may also be located on the same side of the second sample addition port 602 as the third indicator counter electrode 29 and the third indicator working electrode 30, and at this time the notch 66 disposed on one side of the second channel forming layer 11 is in liquid communication with one end of the second channel forming area 56 and of course, it may also be in liquid communication with the middle part of the second channel forming area 56.

The fourth exposure hole 48 and the fifth exposure hole 49 each expose at least partially one of the pair of HCT electrodes 28. In the three exposure holes, the distance between the sixth exposure hole 50 and the second electrical connection end 13 is the largest, followed by the distance between the fifth exposure hole 49 and the second electrical connection end 13, and the distance between the fourth exposure hole 48 and the second electrical connection end 13 is the smallest. The sixth exposure hole 50 is located near the third exposure hole 49 to partially expose the insulating region of the second insulating substrate 8. The purpose of providing the sixth exposure hole 50 is that the sixth exposure hole 50 is in communication with the fourth air hole 54 disposed on the second biosensor 101 on the air path, thereby facilitating sample to adequately cover the pair of HCT electrodes 28.

When each of the HCT electrodes 28 is manufactured, the conductive material in the middle region of each HCT electrode 28 is distributed more evenly, and the electrical signal thus measured is better, so that the fifth exposure hole 49 and the sixth exposure hole 50 preferably each expose the middle region of each HCT electrode 28. In addition, when the electrochemical biosensor 200 is assembled, even if a relative offset occurs between the second reaction region forming layer 10 and the second insulating substrate 8, it is possible to ensure that the area of the HCT electrode exposed by the fifth exposure hole 49 and the sixth exposure hole 50 remains the same, thereby ensuring the consistency of electrical signals generated by different batches of electrochemical biosensors 200. Of course, the fourth exposure hole 48, the fifth exposure hole 49 and the sixth exposure hole 50 can be partially merged, for example, the fourth exposure hole 48 and the fifth exposure hole 49 can be merged together, the fifth exposure hole 49 and the sixth exposure hole 50 can also be merged together, and even the fourth exposure hole 48, the fifth exposure hole 49 and the sixth exposure hole 50 can also be merged together. In addition, the fourth exposure hole 48, the fifth exposure hole 49 and the sixth exposure hole 50 can also be merged with the fourth reaction region 46.

The notch 66 is in liquid communication with the middle part of the second channel forming area 56, which divides the second channel forming area 56 into two parts, so that after the sample is added through the second sample addition port 602, when the sample enters into the second channel forming layer 11 through the notch 66, sample diverging occurs: one part of the sample flowing into the first part of the second channel forming area 56 and the other part flowing into the second part of the second channel forming area 56. The sample flowing into the first part of the second channel forming area 56 eventually flows to the pair of HCT electrodes 28 through the fourth exposure hole 48 and the fifth exposure hole 49 to detect the HCT value of the sample, and the sample flowing into the second part of the second channel forming area 56 eventually flows to the third indicator counter electrode 29 and the third indicator working electrode 30 through the fourth reaction region 46 to detect the third indicator.

The fourth air hole 54 is located above the first part of the second channel forming area 56, and is in communication with the first part of the second channel forming area 56 and the sixth exposure hole 50 on the air path to discharge the air in the second sample channel when the sample is added. The third air hole 53 is located above the second part of the second channel forming area 56, and is in communication with the second part of the second channel forming area 56 on the air path to discharge the air in the second sample channel when the sample is added.

The electrochemical test strip of the present embodiment can measure four indicators: a first indicator (such as urea) measured by the first indicator reference electrode 21 and the first indicator working electrode 22 disposed in the first biosensor 100; a second indicator (such as creatinine) measured by the second indicator working electrode 23 and the second indicator counter electrode 24 disposed in the first biosensor 100; a third indicator (such as uric acid) measured by the third indicator counter electrode 29 and the third indicator working electrode 30 disposed in the second biosensor 101; and HCT measured by the pair of HCT electrodes 28 disposed in the second biosensor 101. The layouts of the electrodes for detecting the four indicators consisting of urea, creatinine, urea and HCT in the first biosensor 100 and the second biosensor 101 can also be adjusted as needed. For example, the electrodes for detecting three of the indicators can be disposed in the first biosensor 100 or the second biosensor 101 at the same time, and the electrodes for detecting the remaining indicator is disposed in the second biosensor 101 or the first biosensor 100. In addition, the pair of HCT electrodes 28 in the present embodiment may also be replaced with a pair of electrodes for detecting an analyte such as glucose in the sample.

Figure 8:
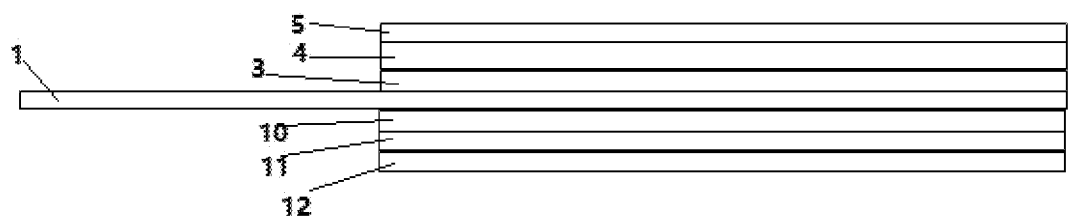
FIG. 8 is a lateral schematic diagram of the electrochemical test strip, with the first biosensor and the second biosensor sharing the same insulating substrate.
Figure 9:
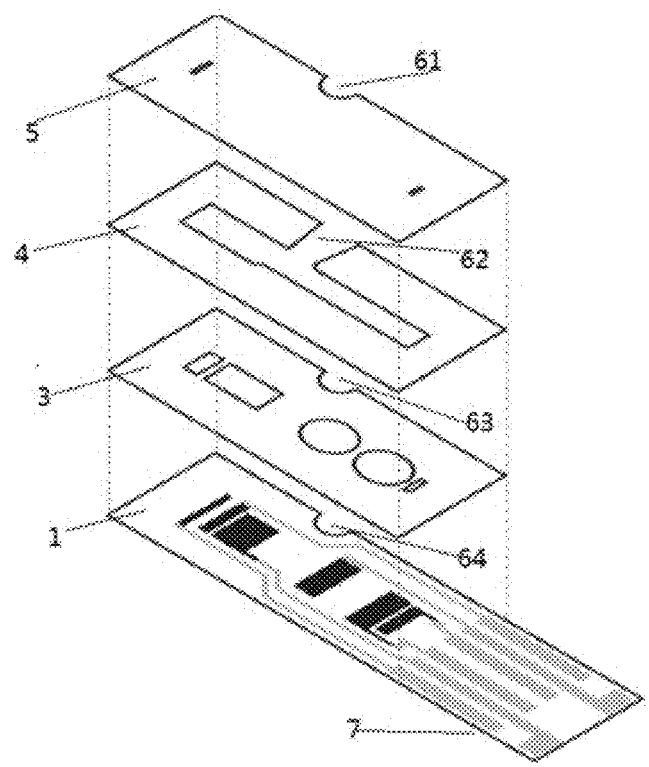
FIG. 9 is an exploded view of a first biosensor of a third electrochemical test strip, with one side of the first insulating substrate provided with a notch.
Figure 10:
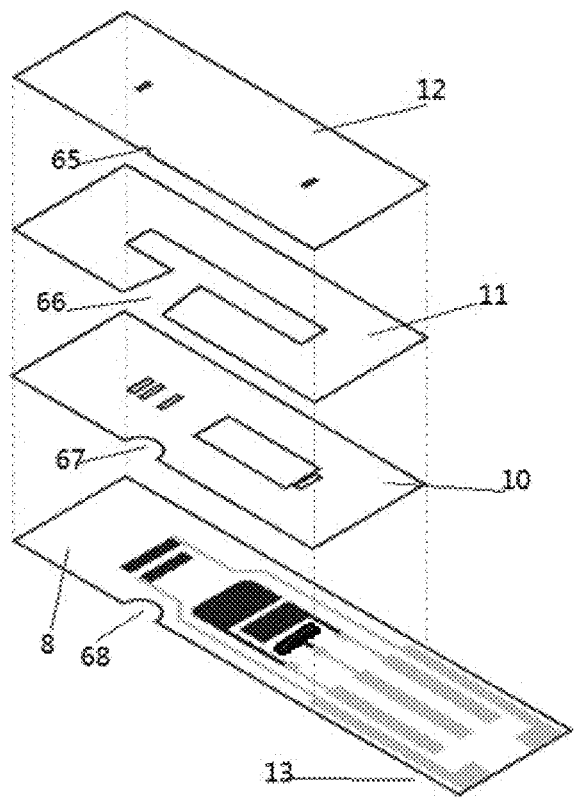
FIG. 10 shows an exploded view of a second biosensor of the third electrochemical test strip, with one side of the second insulating substrate provided with a notch.
Figure 11:
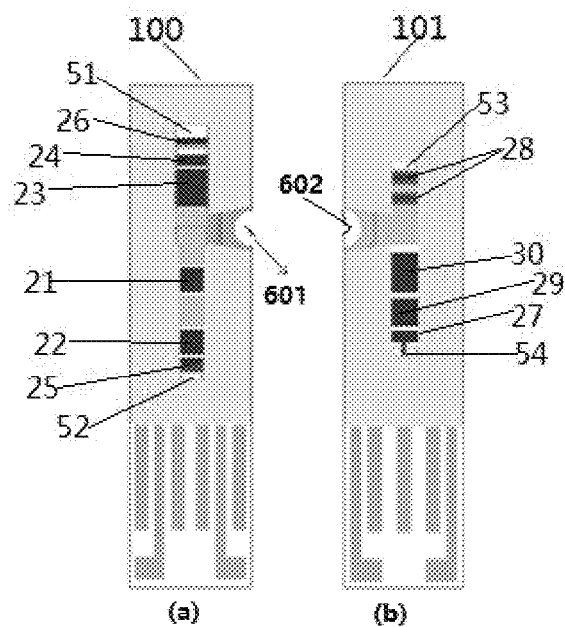
FIG. 11(a) is a schematic diagram of the first biosensor in FIG. 9 when being assembled together.
FIG. 11(b) shows a schematic view of the second biosensor in FIG. 10 when being assembled together, with the dimension of the notch located on one side of the first upper cover layer being larger than that of the notch located on one side of the second upper cover layer.

In the fifth embodiment of the present invention, an electrochemical test strip is utilized to detect multiple indicators in the sample. It differs from the first embodiment in that as shown in FIG. 8, the first biosensor 100 and the second biosensor 101 share the same insulating substrate, that is, they share the first insulating substrate 1, which reduces the thickness and manufacturing cost of the electrochemical biosensor 200. In addition, the preparation of the electrochemical test strip in the present embodiment is substantially the same as that in the first embodiment, except that in the screen printing process, the first electrode system and the first reaction region forming layer are printed on the front side of the first insulating substrate 1; the second electrode system and the second reaction region forming layer are printed on the back side of the first insulating substrate 1; then, the first base card solution fixing process, the second base card solution fixing process, the laminating process and the cutting process are carried out as in the first embodiment, so as to prepare the electrochemical test strip in the present embodiment.

Figure 12:
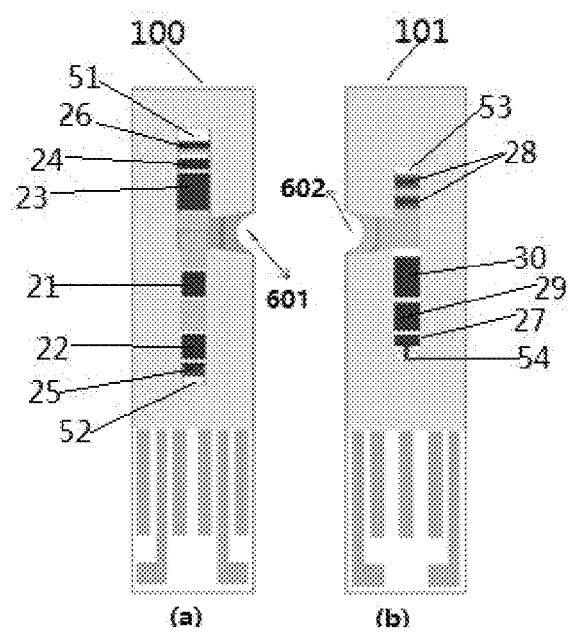
FIG. 12(a) is a schematic diagram of the first biosensor in FIG. 9 when being assembled together, and FIG. 12(b) differs from FIG. 11b is that the dimension of the notch located on one side of the first upper cover layer is equal to that of the notch located on one side of the second upper cover layer.

In the sixth embodiment of the present invention, an electrochemical test strip is utilized to detect multiple indicators in a sample. It differs from the first embodiment in that as shown in FIGS. 5 and 12, in the first biosensor 100, one side of the first insulating substrate 1 is also provided with a notch 64, and the notch 64 is disposed in the same side of the first biosensor 100 as the notches 61, 62 and 63 and aligned with them in position to form the first sample addition port 601 together; and in the second biosensor 101, one side of the second insulating substrate 8 is provided with a notch 68, and the notch 68 is disposed in the same side of the second biosensor 101 as the notches 65, 66 and 67 and aligned with them in position to form the second sample addition port 602 together. The first sample addition port 601 and the second sample addition port 602 jointly constitute the sample addition port 6 of the electrochemical test strip. The dimension of the notch 65 is the same as that of the notch 61.

In the seventh embodiment of the present invention, an electrochemical test strip is utilized to detect multiple indicators in a sample. It differs from the sixth embodiment in that as shown in FIGS. 5 and 9 to 11, the dimension of the notch 65 is smaller than that of the notch 61, which is beneficial to loading the sample in the second biosensor 101 (in particular the second upper cover layer 12), facilitating the rapid flow of the sample into the first biosensor 100 and the second sensor 101. Of course, the dimension of the notch 65 may also be smaller than that of the notch 61.

Of course, in terms of the first biosensor 100, both the first upper cover layer 5 and the first insulating substrate 1 may be without a notch, or only the first upper cover layer 5 or the first insulating substrate 1 is provided with a notch, or the first upper cover layer 5 and the first insulating substrate 1 each are provided with a notch. In terms of the second biosensor 101, both the second insulating substrate 8 and the second upper cover 12 may be without a notch, or only the second insulating substrate 8 or the second upper cover 12 is provided with a notch, or the second insulating substrate 8 and the second upper cover 12 each are provided with a notch.

In the eighth embodiment of the invention, an electrochemical test strip is utilized to detect multiple indicators. It differs from the second embodiment in that as shown in FIGS. 13 to 14, multiple diffusion components are disposed on the first insulating substrate 1 of the first biosensor 100, wherein a diffusion component 33 is disposed on each of the two opposed sides of the first indicator reference electrode 21, and a diffusion component 33 is disposed on one side of the first indicator working electrode 22, and the first sample filling electrode 25 is on the other opposed side of the first indicator working electrode 22. Preferably, the first sample filling electrode 25 is made of conductive ink, so that the first sample filling electrode 25 can also act as a diffusion component. The purpose of disposing multiple diffusion components on the front insulating substrate 1 is to facilitate the rapid and uniform diffusion of the reaction reagent solutions in the reaction regions when the first indicator first reaction reagent solution is added to the second reaction region 41 and the first indicator second reaction reagent solution is added to the first reaction region 42.

At least one diffusion component may also be placed only on one side of the first indicator working electrode 22 and/or the first indicator reference electrode 21 as needed. The first reaction region 42 covers at least a part of each diffusion component disposed on two opposed sides or one side of the first indicator reference electrode 21.

Similarly, at least one diffusion component may also be placed on one or two opposed sides of the second indicator working electrode 23 and the second indicator counter electrode 24 as needed. Similarly, at least one diffusion component may also be disposed only on one or two opposed sides of the third indicator counter electrode 29 and the third indicator working electrode 30 on the second insulating substrate 8 as needed. Since the third sample filling electrode 27 is located on one side of the third indicator counter electrode 29, the third sample filling electrode 27 may also act as a diffusion component when the third sample filling electrode 27 is made of conductive ink.

In the ninth embodiment of the present invention, an electrochemical test strip is utilized to detect multiple indicators in a sample. It differs from the first embodiment in that as shown in FIG. 5, on the basis of the first embodiment, the electrochemical test strip further comprises the first sample filling electrode 25, second sample filling electrode 26, first exposure hole 44 and second exposure hole 45 in the second embodiment, the third sample filling electrode 27 and third exposure hole 47 in the third embodiment, the pair of special HCT electrodes 28, fourth exposure hole 48, fifth exposure hole 49 and sixth exposure hole 50 in the fourth embodiment, and the diffusion component(s) in the eighth embodiment; and a notch 64 is also disposed in one side of the first insulating substrate 1 and a notch 68 is also disposed in one side of the second insulating substrate 8, the dimension of the notch 65 being smaller than the dimension of the notch 61. The first part of the second channel forming area 56 at least partially exposes the fourth reaction region 46 and the third exposure hole 47. The second part of the second channel forming area 56 at least partially exposes the fourth exposure hole 48, the fifth exposure hole 49 and the sixth exposure hole 50.

The notch 66 divides the second channel forming area 56 into two parts, and the second sample channel is correspondingly divided into two parts. The first part of the second sample channel is used to provide a sample to the pair of HCT electrodes 28 and can be used to detect the HCT value of the sample. The second part of the second sample channel is used to provide the sample to the third indicator counter electrode 29 and the third indicator working electrode 30, dissolve the reaction reagent in the fourth reaction region 46 and react, thereby generating an electrical signal. The fourth air hole 54 is located above the first part of the second sample channel, and is in communication with the first part of the second sample channel and the sixth exposure hole 50 on the air path to discharge the air in the first part of the second sample channel when the sample is added. The third air hole 53 is located above the second part of the second sample channel, and is in communication with the second part of the second sample channel and the third exposure hole 47 on the air path to discharge the air in the second part of the second sample channel when the sample is added.

Figure 15:
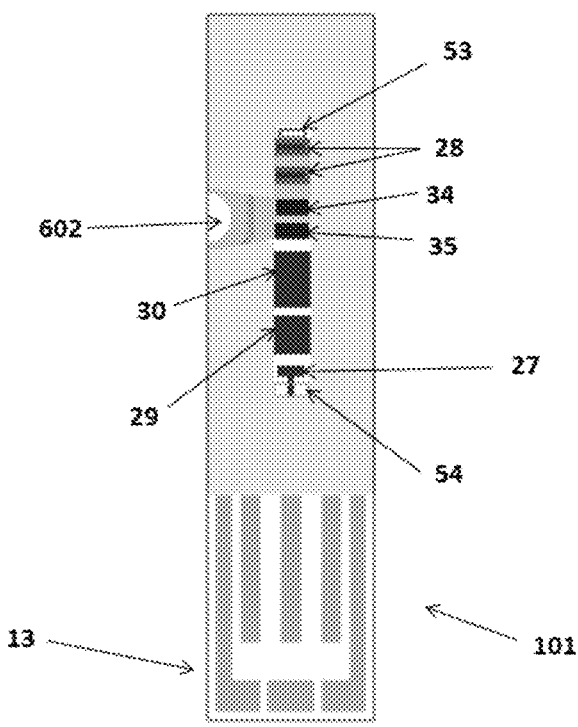
FIG. 15 is a schematic diagram of the second biosensor containing a hydrophilic element when being assembled together.

In the tenth embodiment of the present invention, an electrochemical test strip is utilized to detect multiple indicators in a sample. It differs from the eighth embodiment in that as shown in FIGS. 14 and 15, the electrochemical test strip further contains a hydrophilic element. When the sample flows to the first channel forming area, the sample diverging occurs, and the position where the diverging occurs is the diverging point. At the diverging point, a part of the sample flows to the second indicator working electrode 23, the second indicator counter electrode 24 and the first sample filling electrode 26, and the other part of the sample flows to the first indicator reference electrode 21, the first indicator working electrode 22 and the second sample filling electrode 25. A first hydrophilic element 31 and a second hydrophilic element 32 located at or near the sample diverging point are disposed on the first insulating substrate 1. The first hydrophilic element 31 and the second hydrophilic element 32 may be made of a hydrophilic material. The second indicator working electrode 23 and the second indicator counter electrode 24 are located on one side of the sample diverging point, and the first indicator reference electrode 21 and the first indicator working electrode 22 are located on the other opposite side of the sample diverging point; and the distance from the second indicator working electrode 23 or the second indicator counter electrode 24 to the sample diverging point is greater than the distance from the first hydrophilic element 31 to the sample diverging point, and the distance from the first indicator reference electrode 21 or the first indicator working electrode 22 to the sample diverging point is greater than the distance from the second hydrophilic element 32 to the sample diverging point. A hydrophobic insulting region is disposed for separation between the first hydrophilic element 31 and the second hydrophilic element 32, between the first hydrophilic element 31 and the second indicator working electrode 23 or the second indicator counter electrode 24, and between the second hydrophilic element 32 and the second indicator counter electrode 24 or the second indicator working electrode 23. Such design can avoid mutual interference between the diverged samples, and at the same time, the design of the first hydrophilic element 31 and the second hydrophilic element 32 is beneficial to more rapid flow of the samples into the third reaction region 43, the second reaction region 41, and the first reaction region 42 and the electrodes exposed thereby of the first biosensor 100. More hydrophilic elements can also be provided, or only one hydrophilic element can be provided.

In terms of the second biosensor 101, when the sample flows onto the second insulating substrate 8, sample diverging occurs, with one part of the sample flowing to a pair of HCT electrodes 28 and the other part of the sample flowing to the third indicator counter electrode 29, the third indicator working electrode 30 and the third sample filling electrode 27. Preferably, as shown in FIG. 15, one or more corresponding hydrophilic elements, for example, two hydrophilic elements, i.e., the third hydrophilic element 34 and the fourth hydrophilic element 35, may also be disposed at or near the sample diverging point on the second insulating substrate 8, and the material and location arrangement of the third hydrophilic element 34 and the fourth hydrophilic element 35 are similarly to those of the first hydrophilic element 31 and the second hydrophilic element 32 on the first insulating substrate 1.

Figure 16:
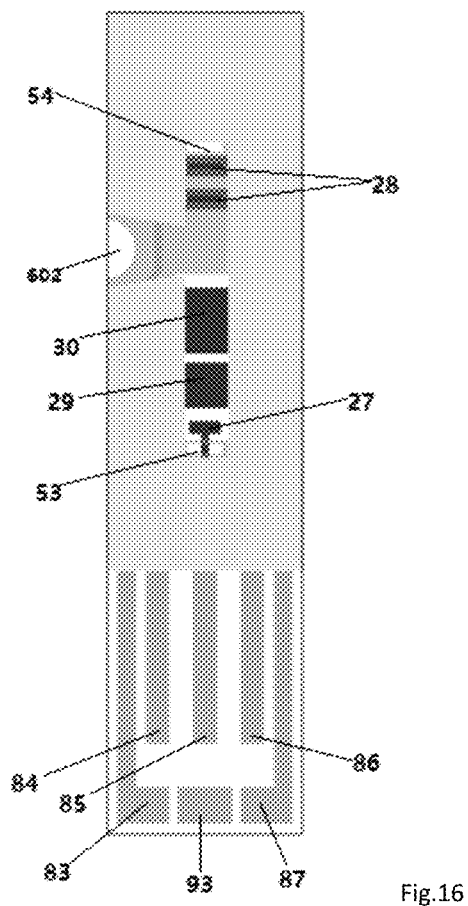
FIG. 16 is a schematic diagram of the second biosensor including an automatic power-on contact when being assembled together.

In the eleventh embodiment of the present invention, an electrochemical test strip is utilized to detect multiple indicators in a sample. It differs from the first embodiment in that as shown in FIG. 16, a conductive automatic power-on contact 93 can also be disposed on the second insulating substrate 8, and the automatic power-on contact 93 is located at the second electrical connection end 13; when the electrochemical test strip is inserted into the electrical connector of a detecting instrument in a correct direction, the automatic power-on contact 93 can form a closed circuit with the detecting instrument, so that the detecting instrument can be powered on automatically; and when the electrochemical test strip is inserted in an opposite direction, the automatic power-on contact 93 cannot form a closed circuit with the detecting instrument, so that the detecting instrument cannot be automatically powered on, and then the electrochemical test strip cannot perform the detection. Therefore, providing the automatic power-on contact 93 can help the detecting instrument identify the front and back sides of the electrochemical test strip, and prevent incorrect insertion and insertion of other mismated electrochemical test strips. It is also possible that an automatic power-on contact located at the first electrical connection end 7 is disposed on the first insulating substrate 1, or one such automatic power-on contact is disposed on each of the first insulating substrate 1 and the second insulating substrate 8, so that the detecting instrument can be powered on automatically only when the electrochemical test strip is used with a detecting instrument mated with the same.

In the twelfth embodiment of the present invention, its similarity with the first embodiment is that both the first upper cover layer and the second upper cover layer are transparent, so that even after the electrochemical test strip has been assembled, the colors of the first insulating substrate 1 and the second insulating substrate 8 can also be observed, and it differs from the first embodiment in that the first insulating substrate 1 and the second insulating substrate 8 can be made of insulating materials of different colors, so that the front and back sides of the electrochemical test strip can be distinguished by observing the colors of the first insulating substrate 1 and the second insulating substrate 8, that is, the first biosensor 100 and the second biosensor 101 can be distinguished, thereby preventing the electrochemical test strip from being inversely inserted into the detecting instrument. The first upper cover layer and the second upper cover layer may also be opaque, and at this time the first upper cover layer and the second upper cover layer can be made of insulating materials of different colors, so that the front and back sides of the electrochemical test strip can be distinguished by observing the colors of the first upper cover layer and the second upper cover layer, that is, the first biosensor and the second biosensor can be distinguished, thereby preventing the electrochemical test strip from being inversely inserted into the detecting instrument.

In the present invention, each electrode system is made of any conductive material, such as carbon film, gold, silver, tin oxide/gold, platinum, other precious metals or their oxides. The surface of the first upper cover layer facing the first channel forming layer and the surface of the second upper cover layer facing the second channel forming layer are coated with a layer of hydrophilic material. Any hydrophilic element used in the present invention is made of a hydrophilic material. The hydrophilic material mentioned in the present invention can be selected from starch, polysaccharide, cellulosic molecules, polyacrylic acid, polyacrylamide, polyvinyl alcohol, polyurethane, polyamide and carbon ink. The hydrophilic element is preferably conductive carbon ink.

The electrochemical test strip is provided with a label for distinguishing the front and back sides of the electrochemical test strip, and the label is a conductive automatic power-on contact, a colored insulating material, a word, a letter, a graph, etc. It can be reasonably deduced that according to the twelve embodiments of the present invention, at least one of the second embodiment, the third embodiment, the fourth embodiment, the fifth embodiment, the sixth embodiment, the seventh embodiment, the eighth embodiment, the tenth embodiment, the eleventh embodiment and the twelfth embodiment of the present invention may be combined with the first embodiment of the present invention.

Depending on test needs, the electrochemical test strip of the present invention can also be used to detect two or more indicators in a sample, the two or more indicators being selected from glucose, cholesterol, hemoglobin, glycated hemoglobin, uric acid, urea, creatinine, bilirubin, ketone bodies, HCT and pH value. For example, the first biosensor can include a blood glucose detection electrode system and a urea detection electrode system, and the second biosensor can include a cholesterol detection electrode system and a ketone body detection electrode system.

Example 1 Reaction Reagents

Taking the electrochemical test strip of the ninth embodiment as an example, this electrochemical test strip is illustrated by the fact that the first indicator reference electrode 21 and the first indicator working electrode 22 detect urea in the sample by the potentiometric method, the second indicator working electrode 23 and the second indicator counter electrode 24 detect creatinine in the sample by the amperometric method, and the third indicator counter electrode 29 and the third indicator working electrode 30 detect uric acid in the sample by the amperometric method.

In order to detect urea, the first indicator first reaction reagent contained in the second reaction region 41 of the first reaction region forming layer 3 includes 0.05 to 0.5M PBS (pH 5.8-8.0), methylcellulose 0.1-10% (w/w), Triton X-100 0.1% to 1.0% (v/v), and urease (2280 to 8712 U/mL); and the first indicator second reaction reagent contained in the first reaction region 42 of the first reaction region forming layer 3 includes 0.05 to 0.5M PBS (pH 5.8-8.0), methylcellulose 0.1-10% (w/w), Triton X-100 0.1% to 1.0% (v/v), and a ruthenium compound, potassium ferricyanide or potassium ferrocyanide 1.0% to 4.5% (w/w).

To detect creatinine, the second indicator reaction reagent contained in the third reaction region 43 of the first reaction region forming layer 3 includes 0.05 to 0.5M PBS (pH 5.8 to 8.0), a polymer binder (such as methylcellulose) 0.1-10% (w/w), sucrose 0.25% to 1% (w/w), Triton X-100 0.1%-1% (v/v), creatinase (500-5000 U/mL), creatinekinase (500-5000 U/mL), sarcosine oxidase (500-5000 U/mL), and a ruthenium compound, potassium ferricyanide or potassium ferrocyanide 1.0-4.5% (w/w).

To detect uric acid, the third indicator reaction reagent contained in the fourth reaction region 46 of the second reaction region forming layer 3 includes 0.05 to 0.5M PBS (pH 5.8 to 8.0), a polymer binder (such as methyl cellulose) 0.1-10% (w/w), trehalose 0.25% to 1% (w/w), Triton X-100 0.1% to 1.0% (v/v), and a ruthenium compound, potassium ferricyanide or potassium ferrocyanide 2.0 to 10% (w/w).

Example 2 Detection of Clinical Samples

The electrochemical test strip in Example 1 is utilized to detect the levels of urea, creatinine and uric acid in a clinical blood sample.

When the first biosensor 100 and the second biosensor 101 are assembled together, after the sample is added through the sample addition port 6, a part of the sample flows into the first biosensor 100 and enters into the first channel forming area 55 through the notch 61 and the notch 62, and the notch 62 divides the first channel forming area 55 into two parts, therefore, the sample entering the first channel forming area 55 undergoes diverging at this time, with one part of the sample flowing into the first part of the first channel forming area 55, and the other part of the sample flowing into the second part of the first channel forming area 55. The sample flowing into the first part of the first channel forming area 55 eventually flows to the second indicator working electrode 23 and the second indicator counter electrode 24 through the third reaction region 43, and the sample flowing into the second part of the first channel forming area 55 eventually flows to the first indicator reference electrode 21 and the first indicator working electrode 22 through the second reaction region 41 and the first reaction region 42. The part of the sample flowing into the second biosensor 101 enters the second channel forming area 56 through the notch 65 and the notch 66, the notch 66 divides the second channel forming area 56 into two parts, wherein one part of the sample flowing into the second channel forming area 56 flows into the first part of the second channel forming area 56, and the other part flows into the second part of the second channel forming area 56. The sample flowing into the first part of the second channel forming area 56 eventually flows to the pair of HCT electrodes 28 through the fourth exposure hole 48 and the fifth exposure hole 49, and the sample flowing into the second part of the second channel forming area 56 eventually flows to the third indicator counter electrode 29 and the third indicator working electrode 30 through the fourth reaction region 46.

Before testing, the electrochemical test strip is inserted into an electrical connector of a detecting instrument, and the first and second biosensors of the electrochemical test strip are electrically connected to the electrical connector of the detecting instrument. Then, urea, creatinine and uric acid in the sample are detected after a sample is added for a period of time.

After addition of a blood sample, urea in the sample reacts with the first indicator first reaction reagent and the first indicator second reaction reagent, and the potential signal generated between the first indicator reference electrode and the first indicator working electrode is directly proportional to the urea concentration in the sample, so the urea concentration is measured by the potentiometric method and the test time is 3 s to 100 s. Such detecting instrument can convert the detected potential signal into a corresponding urea concentration value. After addition of the blood sample, creatinine in the sample reacts with the second indicator reaction reagent, and the current signal generated after applying a voltage is directly proportional to the creatinine concentration in the sample, so the amperometric method is used for measurement, and the test time is 3 s to 100 s. Such detecting instrument can convert the detected current signal into a corresponding creatinine concentration value. After addition of the blood sample, uric acid in the sample reacts with the third indicator reaction reagent, and the current signal generated after applying a voltage is directly proportional to the uric acid concentration in the sample, so the amperometric method is used for measurement, and the test time is 2 s to 100 s. Such detecting instrument can convert the detected current signal into a corresponding uric acid concentration value.

In addition, the electrochemical test strip also contains a pair of special HCT electrodes, which can be used to measure the HCT value of a blood sample, and the measured HCT value can be used to correct the measured urea, creatinine and uric acid concentrations at the same time, so that the measurement results are more accurate.

A clinical blood sample is taken and detected by using the electrochemical test strip of the present invention and the plasma derived from the blood sample is detected by Mindray BS-350E fully automated biochemical analyzer. The detection results of urea are as shown in Table 1 and FIG. 17, the detection results of creatinine are as shown in Table 2 and FIG. 18, the detection results of uric acid are as shown in Table 3 and FIG. 19.

TABLE 1

Linearity research results of urea

| | Biochemical value of plasma urea (mmol/L) | | | | | | | |
|---|---|---|---|---|---|---|---|---|
| | 3 | 6 | 11 | 16 | 23 | 30 | 37 | 43 |
| Readings in the present invention (mmol/L) | | | | | | | | |
| Reading 1 | 2.9 | 5.9 | 11.1 | 16.7 | 21.0 | 31.8 | 41.6 | 43.1 |
| Reading 2 | 2.7 | 6.6 | 10.6 | 15.7 | 22.4 | 31.6 | 39.0 | 43.2 |
| Reading 3 | 2.9 | 6.4 | 10.1 | 15.6 | 21.8 | 30.4 | 38.9 | 41.4 |
| Average value | 2.83 | 6.30 | 10.60 | 16.00 | 21.73 | 31.27 | 39.83 | 42.57 |
| Standard deviation SD | 0.12 | 0.36 | 0.50 | 0.61 | 0.70 | 0.76 | 1.53 | 1.01 |
| Coefficient of variation CV | 4.1% | 5.7% | 4.7% | 3.8% | 3.2% | 2.4% | 3.8% | 2.4% |
| Deviation from biochemical value of plasma urea % | −3.0% | 8.2% | −5.2% | 0.6% | −5.3% | 4.3% | 6.6% | 0.1% |

Figure 17:
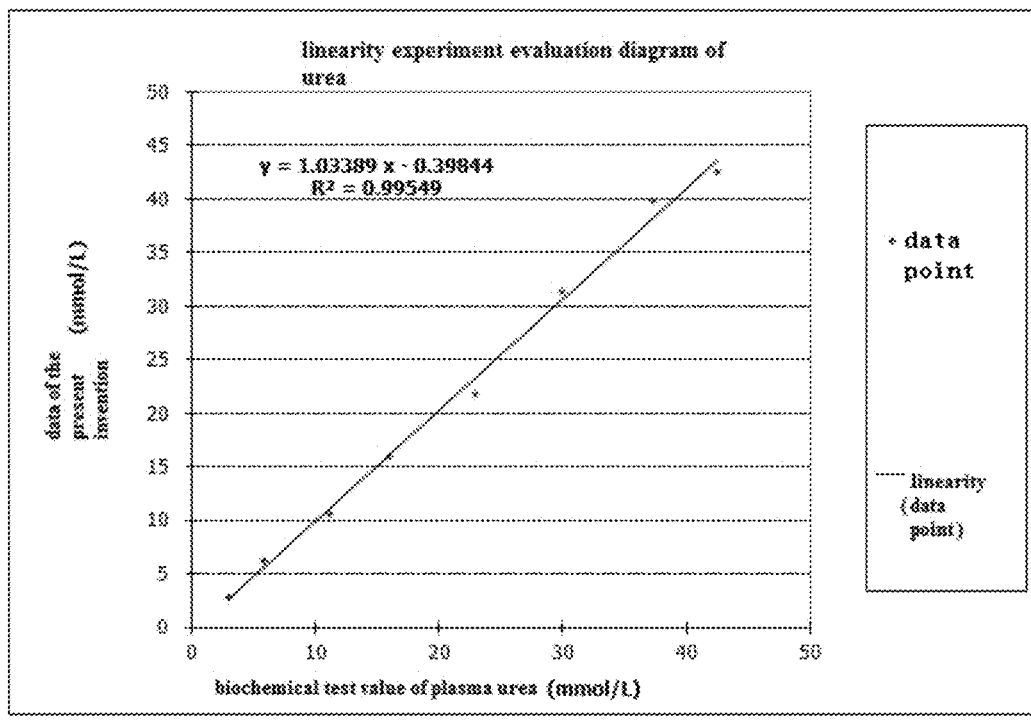
FIG. 17 is a linearity experiment evaluation diagram of urea.

As shown in Table 1 and FIG. 17, the linearity research results of urea show that the linear correlation coefficients $R^2=0.99549$ and $R=0.99774$, and the slope of the linear equation is between 0.90 and 1.10, indicating that urea has a good linear correlation in the concentration range of 3 to 43 mmol/L, and has a good detection accuracy in this concentration range, and the deviations from the biochemical value of plasma urea are all within 10%.

TABLE 2

Linearity research results of creatinine

| | Biochemical value of plasma urea (μmol/L) | | | | | | | |
|---|---|---|---|---|---|---|---|---|
| | 35 | 60 | 126 | 281 | 451 | 599 | 816 | 995 |
| Readings in the present invention (μmol/L) | | | | | | | | |
| Reading 1 | 39 | 55 | 120 | 269 | 420 | 627 | 750 | 997 |
| Reading 2 | 37 | 53 | 121 | 280 | 399 | 602 | 781 | 971 |
| Reading 3 | 36 | 55 | 124 | 268 | 417 | 590 | 771 | 998 |
| Average value | 37.3 | 54.3 | 121.7 | 272.3 | 412.0 | 606.3 | 767.3 | 988.7 |
| Standard deviation SD | 1.53 | 1.15 | 2.08 | 6.66 | 11.36 | 18.88 | 15.82 | 15.31 |
| Coefficient of variation CV | 4.1% | 2.1% | 1.7% | 2.4% | 2.8% | 3.1% | 2.1% | 1.5% |
| Deviation from biochemical value of plasma urea % | 6.7% | −9.4% | −3.4% | −3.1% | −8.6% | 1.2% | 6.0% | 0.5% |

Figure 18:
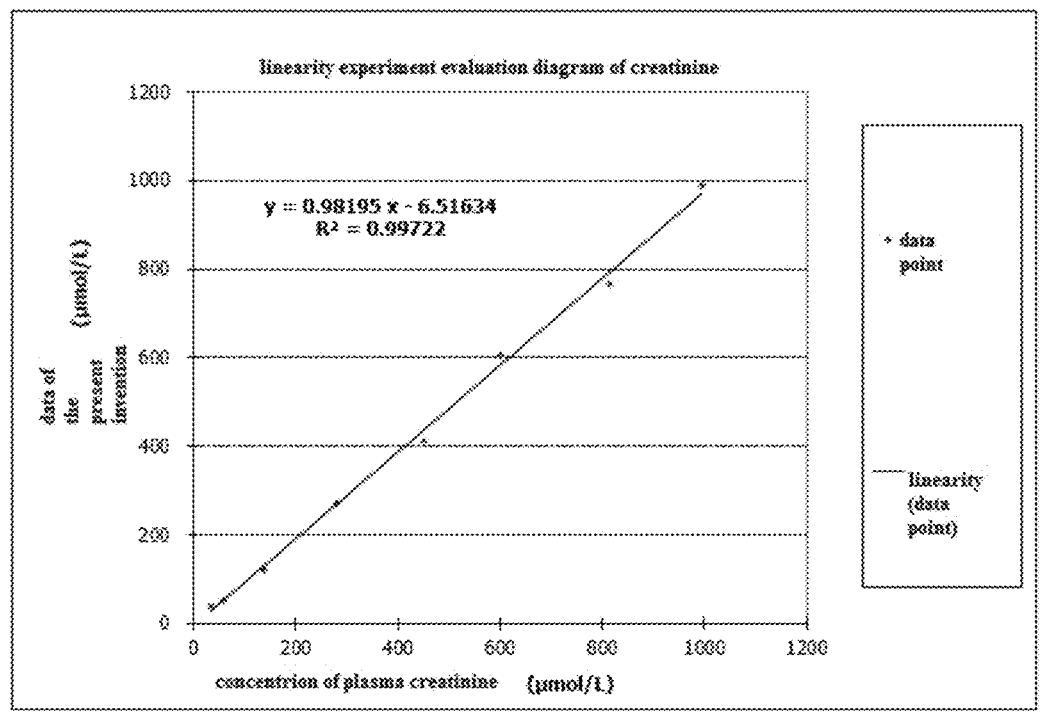
FIG. 18 is a linearity experiment evaluation diagram of creatinine.

As shown in Table 2 and FIG. 18, the linearity research results of creatinine show that the linear correlation coefficients $R^2=0.99722$ and $R=0.99861$, and the slope of the linear equation is between 0.90 and 1.10, indicating that creatinine has a good linear correlation in the concentration range of 35 to 995 μmol/L, and has a good detection accuracy in this concentration range, and the deviations from the biochemical value of plasma creatinine are all within 10%.

TABLE 3

Linearity research results of uric acid

| | Biochemical value of plasma urea (μmol/L) | | | | | | | |
|---|---|---|---|---|---|---|---|---|
| | 120 | 252 | 382 | 520 | 730 | 929 | 1109 | 1313 |
| Readings in the present invention (μmol/L) | | | | | | | | |
| Reading 1 | 105 | 250 | 398 | 535 | 723 | 992 | 1130 | 1371 |
| Reading 2 | 119 | 258 | 394 | 528 | 733 | 946 | 1098 | 1362 |
| Reading 3 | 119 | 265 | 367 | 535 | 733 | 941 | 1135 | 1357 |

TABLE 3-continued

Linearity research results of uric acid

| | Biochemical value of plasma urea (μmol/L) | | | | | | | |
|---|---|---|---|---|---|---|---|---|
| | 120 | 252 | 382 | 520 | 730 | 929 | 1109 | 1313 |
| Average value | 114.3 | 257.7 | 386.3 | 532.7 | 731.3 | 959.7 | 1121.0 | 1363.3 |
| Standard deviation SD | 8.08 | 7.51 | 16.86 | 4.04 | 7.64 | 28.11 | 20.07 | 7.09 |
| Coefficient of variation CV | 7.1% | 2.9% | 4.4% | 0.8% | 1.0% | 2.9% | 1.8% | 0.5% |
| Deviation from biochemical value of plasma urea % | −4.7% | 2.2% | 1.1% | 2.4% | 0.2% | 3.3% | 1.1% | 3.8% |

Figure 19:
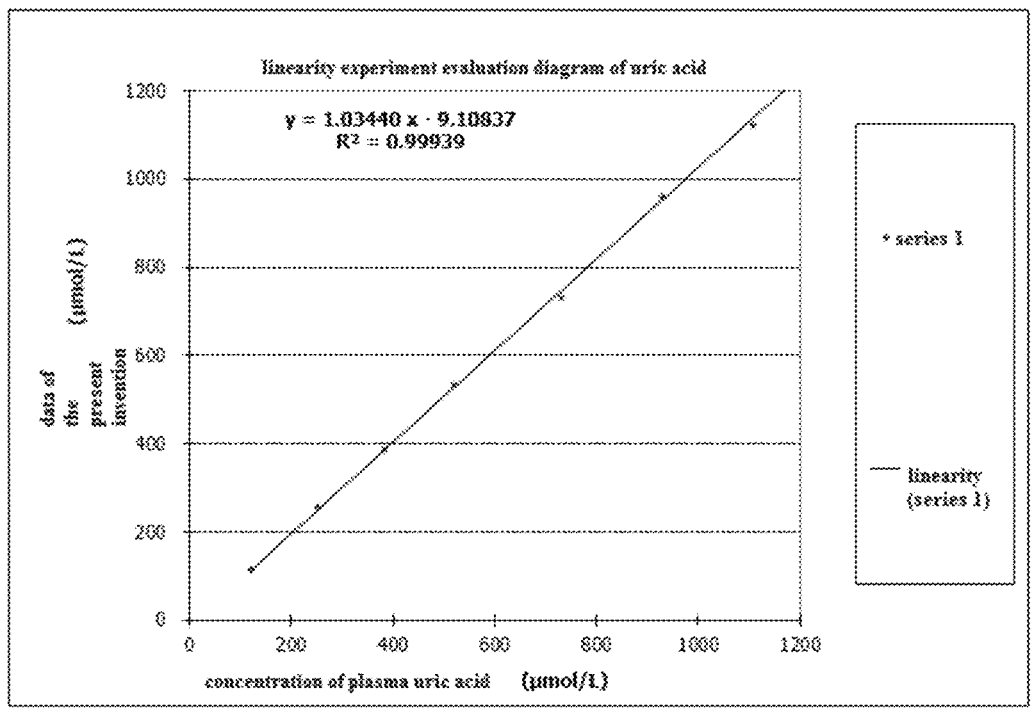
FIG. 19 is a linearity experiment evaluation diagram of uric acid.

As shown in Table 3 and FIG. 19, the linearity research results of uric acid show that the linear correlation coefficients $R^2=0.99939$ and $R=0.99969$, and the slope of the linear equation is between 0.90 and 1.10, indicating that uric acid has a good linear correlation in the concentration range of 120 to 1313 μmol/L, and has a good detection accuracy in this concentration range, and the deviations from the biochemical value of plasma uric acid are all within 10%.

The invention claimed is:

1. An electrochemical test strip for detecting multiple indicators, comprising a first biosensor which comprises an insulating substrate, a first electrode system disposed on the insulating substrate, a first channel forming layer and a first upper cover layer, a first channel forming area disposed in the first channel forming layer, the first channel forming area disposed above at least one electrode of the first electrode system, wherein the electrochemical test strip further comprises a second biosensor, and the second biosensor comprises an insulating substrate, a second electrode system disposed on the insulating substrate, a second channel forming layer and a second upper cover layer, a second channel forming area disposed in the second channel forming layer, the second channel forming area disposed above at least one electrode of the second electrode system; the first biosensor and the second biosensor are located on the front and back sides of the electrochemical test strip, respectively, and the electrical connection end of the first biosensor and the electrical connection end of the second biosensor are located at the same end of the electrochemical test strip; and the sample addition port of the electrochemical test strip is in liquid communication with the first channel forming area of the first biosensor and the second channel forming area of the second biosensor, respectively, wherein the sample addition port comprises a notch in the first upper cover layer and a notch in the second upper cover layer.

2. The electrochemical test strip according to claim 1, wherein the first electrode system comprises an electrode system for measuring a first indicator and an electrode system for measuring a second indicator.

3. The electrochemical test strip according to claim 2, wherein the second electrode system comprises an electrode system for measuring a third indicator.

4. The electrochemical test strip according to claim 3, wherein the second electrode system comprises an electrode system for measuring a fourth indicator.

5. The electrochemical test strip according to claim 2, wherein the electrode system for measuring the first indicator and the electrode system for measuring the second indicator are located on two opposed sides of the sample addition port, respectively.

6. The electrochemical test strip according to claim 4, wherein the electrode system for measuring the third indicator and the electrode system for measuring the fourth indicator are located on two opposed sides of the sample addition port, respectively.

7. The electrochemical test strip according to claim 1, wherein the first biosensor and the second biosensor share one insulating substrate, or the first biosensor and the second biosensor each comprise an insulating substrate.

8. He electrochemical test strip according to claim 1, wherein a first reaction region forming layer is disposed between the insulating substrate and the first channel forming layer of the first biosensor, and/or a second reaction region forming layer is disposed between the insulating substrate and the second channel forming layer of the second biosensor.

9. The electrochemical test strip according to claim 1, wherein the notches in the first upper cover layer and the second upper cover layer are located on the same side of the electrochemical test strip and aligned in position, and the notch in the first upper cover layer is larger than that in the second upper cover layer.

10. The electrochemical test strip according to claim 1, wherein the electrochemical test strip is also provided with a label for distinguishing the front and back sides of the electrochemical test strip.

11. The electrochemical test strip according to claim 10, wherein the label is a conductive automatic power-on contact and is disposed in at least one of the insulating substrate of the first biosensor and the insulating substrate of the second biosensor.

12. The electrochemical test strip according to claim 10, wherein the label is a colored insulating material; when the first upper cover layer and the second upper cover layer are transparent, the side of the insulating substrate of the first biosensor facing the first channel forming layer and the side of the insulating substrate of the second biosensor facing the second channel forming layer are made of materials of different colors; and when the first upper cover layer and the second upper cover layer are opaque, the first upper cover layer and the second upper cover layer are made of materials of different colors.

13. The electrochemical test strip according to claim 1, wherein the electrochemical test strip is used for measuring at least two indicators selected from glucose, cholesterol, hemoglobin, glycated hemoglobin, uric acid, urea, creatinine, bilirubin, ketone body, HCT and pH value.

14. A method for detecting multiple indicators, comprising providing the electrochemical test strip according to claim 1.

15. The method according to claim 14, wherein the first electrode system comprises an electrode system for measuring a first indicator and an electrode system for measuring a second indicator.

16. The method according to claim 15, wherein the second electrode system comprises an electrode system for measuring a third indicator.

17. The method according to claim 16, wherein the second electrode system comprises an electrode system for measuring a fourth indicator.

18. The method according to claim 16, wherein the first indicator is urea, the second indicator is creatinine and the third indicator is uric acid.

19. The method according to claim 18, wherein the first indicator is measured potentiometrically, and the second indicator and the third indicator are measured amperometrically.

* * * * *